United States Patent
Baumberg

(10) Patent No.: US 7,034,821 B2
(45) Date of Patent: Apr. 25, 2006

(54) THREE-DIMENSIONAL COMPUTER MODELLING

(75) Inventor: Adam Michael Baumberg, Bracknell (GB)

(73) Assignee: Canon Kabushiki Kaisha, Tokyo (JP)

(*) Notice: Subject to any disclaimer, the term of this patent is extended or adjusted under 35 U.S.C. 154(b) by 328 days.

(21) Appl. No.: 10/413,290

(22) Filed: Apr. 15, 2003

(65) Prior Publication Data
US 2003/0218607 A1    Nov. 27, 2003

(30) Foreign Application Priority Data
Apr. 18, 2002    (GB) .............................. 0208909.2

(51) Int. Cl.
*G06T 15/00*    (2006.01)

(52) U.S. Cl. ....................... 345/419; 345/582; 382/154

(58) Field of Classification Search ................ 345/419, 345/420, 421, 427, 518, 582, 619; 382/154, 382/191
See application file for complete search history.

(56) References Cited

U.S. PATENT DOCUMENTS

| | | | |
|---|---|---|---|
| 5,717,454 A | 2/1998 | Adolphi et al. ............... 348/61 |
| 5,850,469 A | 12/1998 | Martin et al. ................ 382/154 |
| 6,356,272 B1* | 3/2002 | Matsumoto et al. ........ 345/582 |
| 6,597,369 B1* | 7/2003 | Mochimaru et al. ........ 345/647 |
| 6,744,441 B1* | 6/2004 | Wu et al. .................... 345/582 |
| 6,762,769 B1* | 7/2004 | Guo et al. ................... 345/582 |
| 6,765,572 B1* | 7/2004 | Roelofs ....................... 345/420 |
| 6,867,772 B1* | 3/2005 | Kotcheff et al. ............ 345/420 |
| 2001/0056308 A1 | 12/2001 | Petrov et al. ................. 700/98 |
| 2002/0050988 A1 | 5/2002 | Petrov et al. ............... 345/418 |
| 2002/0085748 A1 | 7/2002 | Baumberg ................... 382/154 |
| 2002/0190982 A1 | 12/2002 | Kotcheff et al. ............ 345/420 |

FOREIGN PATENT DOCUMENTS

| | | |
|---|---|---|
| EP | 0 898 245 A1 | 7/1998 |
| EP | 0 898 245 A1 | 2/1999 |
| GB | 2 358 307 A | 11/1999 |
| GB | 2 369 260 A | 10/2000 |
| GB | 2 369 541 A | 10/2000 |
| JP | 9-170914 | 6/1997 |
| WO | WO 99/55233 | 4/1999 |
| WO | WO 00/04506 | 1/2000 |

(Continued)

OTHER PUBLICATIONS

Martin Löhlein, "A Volumetric Intersection Algorithm for 3D-Reconstruction Using a Boundary-Representation", pp. 1-10 (1984) *(put in the url)*.

(Continued)

*Primary Examiner*—Phu K. Nguyen
(74) *Attorney, Agent, or Firm*—Fitzpatrick, Cella, Harper & Scinto

(57) ABSTRACT

Images of a subject recorded from different viewing positions and directions are processed to calculate the positions and directions, and a 3D computer model of the subject is generated. A further image of the subject, not used in the processing to generate the computer model but showing a part of the subject for which texture data is to be generated, is registered with the computer model by displaying the further image as a stationary image and overlaying images of the computer model from a virtual camera moved by a user. The user sees both the computer model and the stationary image and moves the virtual camera to generate a view of the computer model which corresponds to that shown in the stationary image. The imaging parameters of the virtual camera are stored and texture data for the computer model is generated using the image data from the further image.

26 Claims, 16 Drawing Sheets

FOREIGN PATENT DOCUMENTS

WO     WO 01/39124     11/2000

OTHER PUBLICATIONS

M. Szilvási-Nagy, "An Algorithm for Determining the Intersection of Two Simple Polyhedra", Computer Graphic Forum 3, pp. 219-225 (1984).

Wolfgang Niem, "Automatic Reconstruction of 3D Objects Using a Mobile Camera", Image and Vision Computer 17, pp. 125-134 (1999).

Richard I. Hartley, "Euclidean Reconstruction from Uncalibrated Views", Applications of Invariance in Computer Vision, Mundy, Zisserman and Forsyth eds., pp. 237-256 (Azor s 1993).

J. Illingworth et al., "Looking to Build a Model World: Automatic Construction of Static Obj ct Models Using Computer Vision", Electronics & Communication Engineering Journal, pp. 103-113 (Jun. 1998).

Steven J. Gortler et al., "The Lumigraph", Computer Graphics Proceedings, pp. 43-52 (1996).

Peter J. Neugebauer et al., "Texturing 3D Models of Real World Objects from Multiple Unr gister d Photographic Views", EUROGRAPHICS '99, vol. 18, No. 3 (1999).

Martin Löhlein, "A Volumetric Intersection Algorithm for 3D-Reconstruction Using a Boundary-Representation", pp. 1-10 (1998).

M. Jones et al., "Efficient Representation of Object Shape for Silhouette Intersection". IEE Proceedings: Vision, Image and Signal Processing, Institution of Electrical Engineers, GB, vol. 142, No. 6, pp. 359-365, Dec. 6, 1995.

J. L. Chen et. al., "Recovering and Tracking Pose of Curved 3D Objects from 2D Images", Computer Vision and Pattern Recognition, 1993, Proceedings CVPR '93, 1993 IEEE Computer Society Conf., New York, NY, Jun. 15-17, 1993, pp. 233-239.

R. C. Gonzales et al., "Digital Image Processing", Wesley Publishing Company, pp. 47-49, (1992), XP00225957A.

M. Jones et al., "Registration of Image Sets Using Silhouette Consistency", IEE Proceedings: Vision, Image and Signal Processing, Institution of Electrical Engineer, GB, vol. 147, No. 1, pp. 1-8, Feb. 18, 2000, XP006014550, ISSN 1350-245X.

\* cited by examiner

THREE-DIMENSIONAL COMPUTER MODELLING

This application claims the right of priority under 35 USC § 119 based on British patent application number 0208909.2, filed Apr. 18, 2002, which is hereby incorporated by reference herein in its entirety as if fully set forth herein.

The present invention relates to the computer processing of image data defining images of an object to generate a three-dimensional (3D) computer model of the object and texture data for the model.

Many methods are known for generating 3D computer models of objects.

In particular, methods are known in which images of an object to be modelled are recorded at different positions and orientations relative to the object. If not already known, each recorded image is processed to calculate the position and orientation at which it was recorded. A 3D computer model of the surface shape of the object is then generated using the input images and the positions and orientations. Texture data for the surface shape computer model is then generated from the input image data.

In a first type of such a known method, the subject object being modelled is placed with a calibration object having a known pattern of features thereon, and images showing the subject object together with the calibration pattern are recorded from different positions and directions relative thereto. Each recorded image is then processed to calculate the position and orientation at which is was recorded on the basis of the positions in the image of the features in the calibration object's pattern. Because the subject object and calibration pattern remain stationary relative to each other while the images are recorded, the positions and orientations of the input images relative to the subject object are known as a result of these calculations, and consequently a 3D computer model of the subject object can be generated from the images. Examples of this type of technique are described, for example, in "Automatic Reconstruction of 3D Objects Using A Mobile Camera" by Niem in Image and Vision Computing 17 (1999) pages 125–134, "The Lumigraph" by Gortler et al in Computer Graphics Proceedings, Annual Conference Series, 1996 ACM-0-89791-764-4/96/008, JP-A-9-170914 and the applicant's co-pending U.S. patent application Ser. No. 10/129,626 (the full contents of which are incorporated herein by cross-reference). Texture data for the resulting 3D computer model may then be generated from the images.

In a second type of known method, the subject object to be modelled is imaged alone, without a calibration object. The position and orientation of each image is then calculated by matching features on the object between the different input images and calculating the relative position and orientation of each image in dependence upon the respective positions of the matching features in the images. Examples of such a technique are described, for example, in EP-A-0898245.

In a third type of known method, one or more cameras are mounted in fixed positions and orientations relative to a surface on which the subject object is to stand (so that the positions and orientations of images recorded by the cameras do not need to be calculated) and images of the subject object are recorded by the camera(s). The object may be placed on a turntable so that it can be rotated by defined amounts to allow images of different parts of the object to be recorded.

All of these types of known methods, however, suffer from the problem that accurate texture data for the 3D computer surface model can only be generated for parts of the subject object that are visible in at least one of the initial images.

A further problem arises in the case of the first type of technique (in which the subject object is imaged with a calibration pattern). This is because the subject object cannot be moved relative to the calibration pattern while the images are recorded (otherwise the position and orientation of the subject object is not constant with respect to the calibration pattern and is therefore not known relative to the calculated positions and orientations of the images, with the result that a 3D computer model of the subject object cannot be generated from the images). Consequently, in the typical case where the subject object is placed on the calibration object for imaging, the base of the subject object rests on the calibration object, and therefore features on the base cannot be imaged and reproduced in texture data derived from the image data.

A similar problem arises with the third type of technique because the subject object cannot be moved relative to the surface on which it is standing otherwise its alignment with the fixed camera positions and orientations changes. Accordingly, again, features on the base on the subject object cannot be imaged and reproduced in texture data derived from the image data.

In the case of the second type of technique, a problem arises because the positions and orientations of the images are calculated relative to each other on the basis of matching subject object features in the images. Accordingly, each image needs to be recorded such that at least some matchable features on the subject object are visible in the image and are also visible in at least one further image. This requirement can severely restrict the positions and directions from which images can be taken.

The present invention aims to address at least one of the problems above.

According to the present invention, a 3D computer model of a subject object is generated by processing images of the subject object recorded from different viewing positions and directions. The relative imaging positions and directions of the images (if not already known) are calculated to register the images and a 3D computer model of the surface shape of the subject object is generated using the registered images such that the position and orientation of the computer model relative to the images is known. A further image of the subject object which was not used in the processing to generate the 3D computer surface shape model and which shows a part of the object for which texture data is to be generated (such as the base of the subject object) is registered with the 3D computer surface shape model. The registration is carried out by displaying the further image to a user and providing a virtual camera for control by the user to view the 3D computer surface shape model. The further image is displayed so that it remains stationary and images of the 3D computer model are generated and displayed overlaid in accordance with the virtual camera as it is moved by the user. The images of the 3D computer model are displayed in a form such that the user can see the alignment of the 3D computer model and the subject object in the underlying stationary image. This provides a facility for the user to move the virtual camera to generate a view of the 3D computer model which corresponds to the view of the subject object shown in the displayed further image. The imaging parameters of the virtual camera are then stored to define the image parameters of the further image. In this way, the further image is registered to the 3D computer model. Texture data for the 3D computer model is then generated in dependence upon image data from the further image and at least one initial image.

By performing processing in this way, images of the subject object can be recorded and processed to generate the 3D computer surface shape model and one or more further images can be recorded for use in generating texture data, the recording of each further image not being restricted by the constraints imposed on the recording of the images to generate the 3D computer surface shape model. For example, if a calibration pattern is used, each image to be used to generate the 3D computer surface shape model must be recorded so that a sufficient part of the calibration pattern is visible, but each image to be used only for texture data generation need not show any of the calibration pattern.

Similarly, if the subject object is imaged without a calibration object, each image to be used to generate the 3D computer surface shape model must be recorded to show sufficient numbers of features on the subject object which can be matched with features in at least one other image. However, each image to be used only for texture data generation need not show any features for matching with features in the other images.

The method of registering each further image with the 3D computer model provides an accurate and reliable registration method, enabling texture data faithfully representing the subject object to be generated.

The images of the 3D computer model and the further image may be blended so that the images of the 3D computer model are displayed overlaid in semi-transparent form on the further image. In this way, the user can see both the 3D computer model and the subject object in the underlying further image.

As an alternative, the images of the 3D computer model and the further image may be composited in accordance with a bit-wise logic operation so that the colour displayed to the user changes as the alignment between the 3D computer model and the subject object in the further image changes.

The images of the 3D computer model and the further image may be composited in other ways to achieve the same effect of providing the user with a displayed image which shows the state of the registration of the 3D computer model and the subject object in the further image.

The present invention also provides a processing apparatus and method for use in performing the processing set out above.

The present invention also provides a computer program product, for example as embodied as a storage device or signal carrying instructions, for causing a programmable processing apparatus to become configured as such an apparatus or to become operable to perform such a method.

Embodiments of the invention will now be described, by way of example only, with reference to the accompanying drawings, in which like reference numbers are used to designate like parts, and in which:

FIG. 1 schematically shows the components of an embodiment of the invention, together with the notional functional processing units into which the processing apparatus component may be thought of as being configured when programmed by programming instructions;

Figure 4:
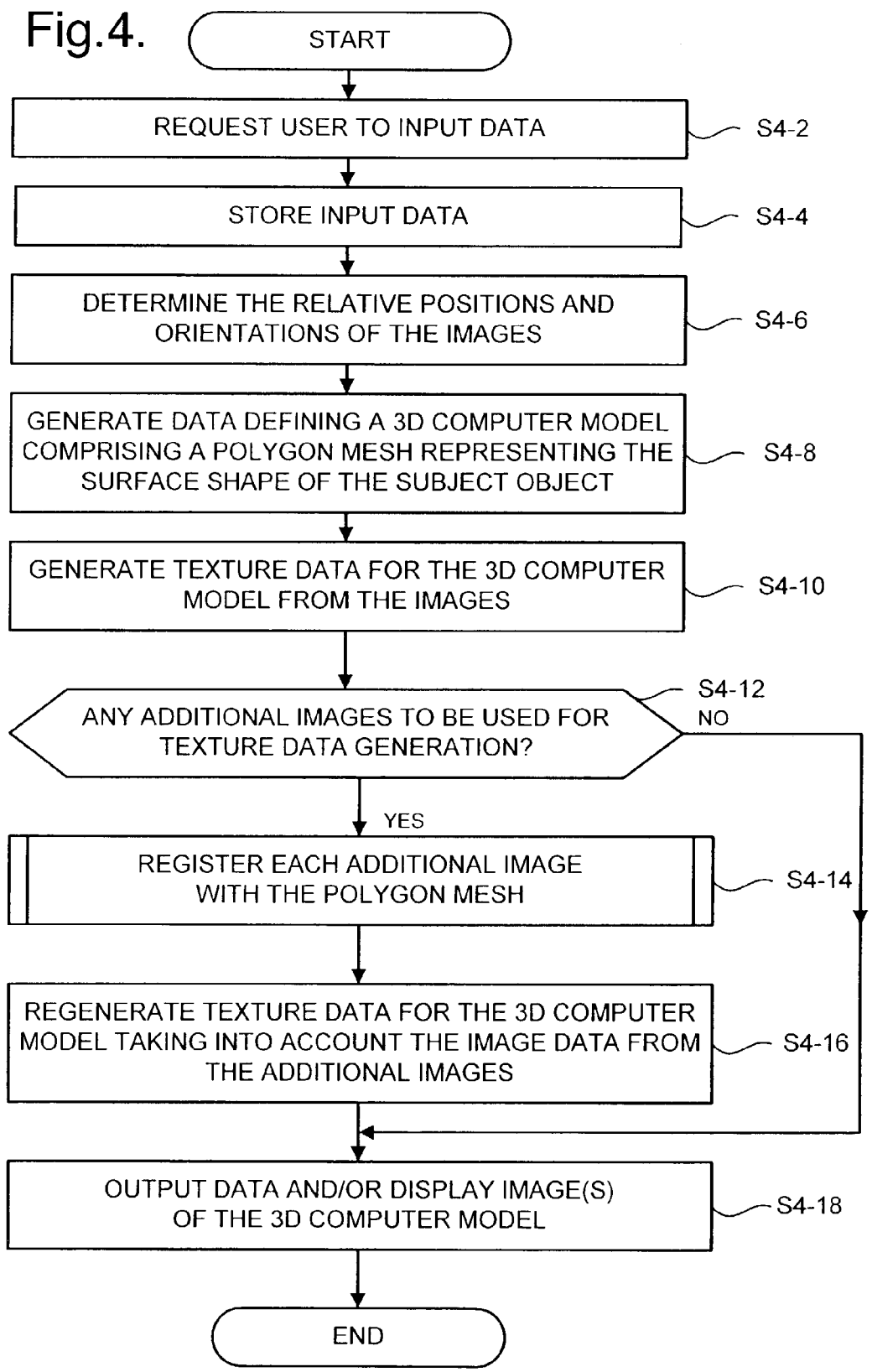
FIG. 4 shows the processing operations performed by the processing apparatus in FIG. 1 to process input data.
Figure 8:
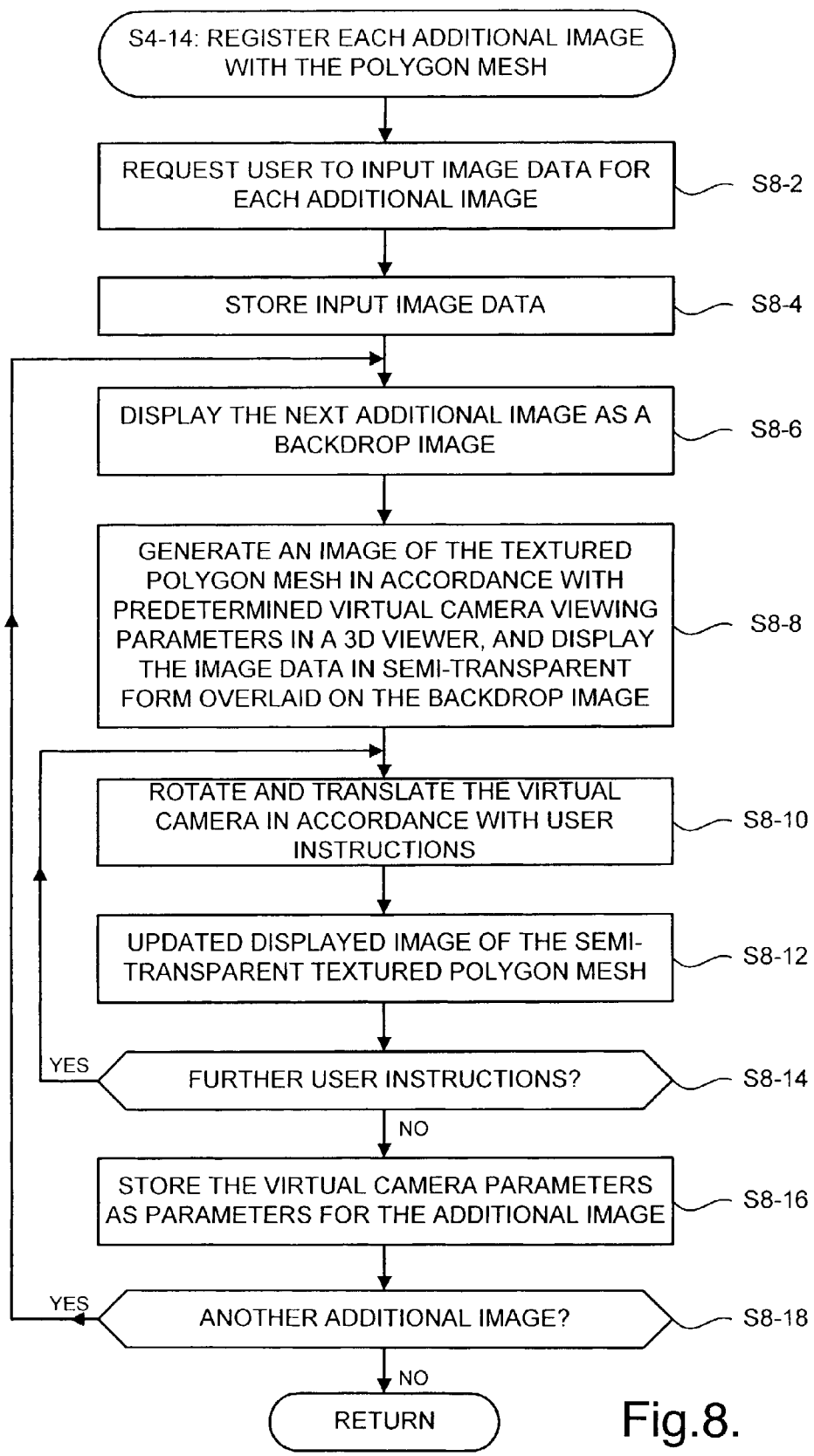
FIG. 8 shows the processing operations performed at step S4-14 in FIG. 4.
Figure 10A:
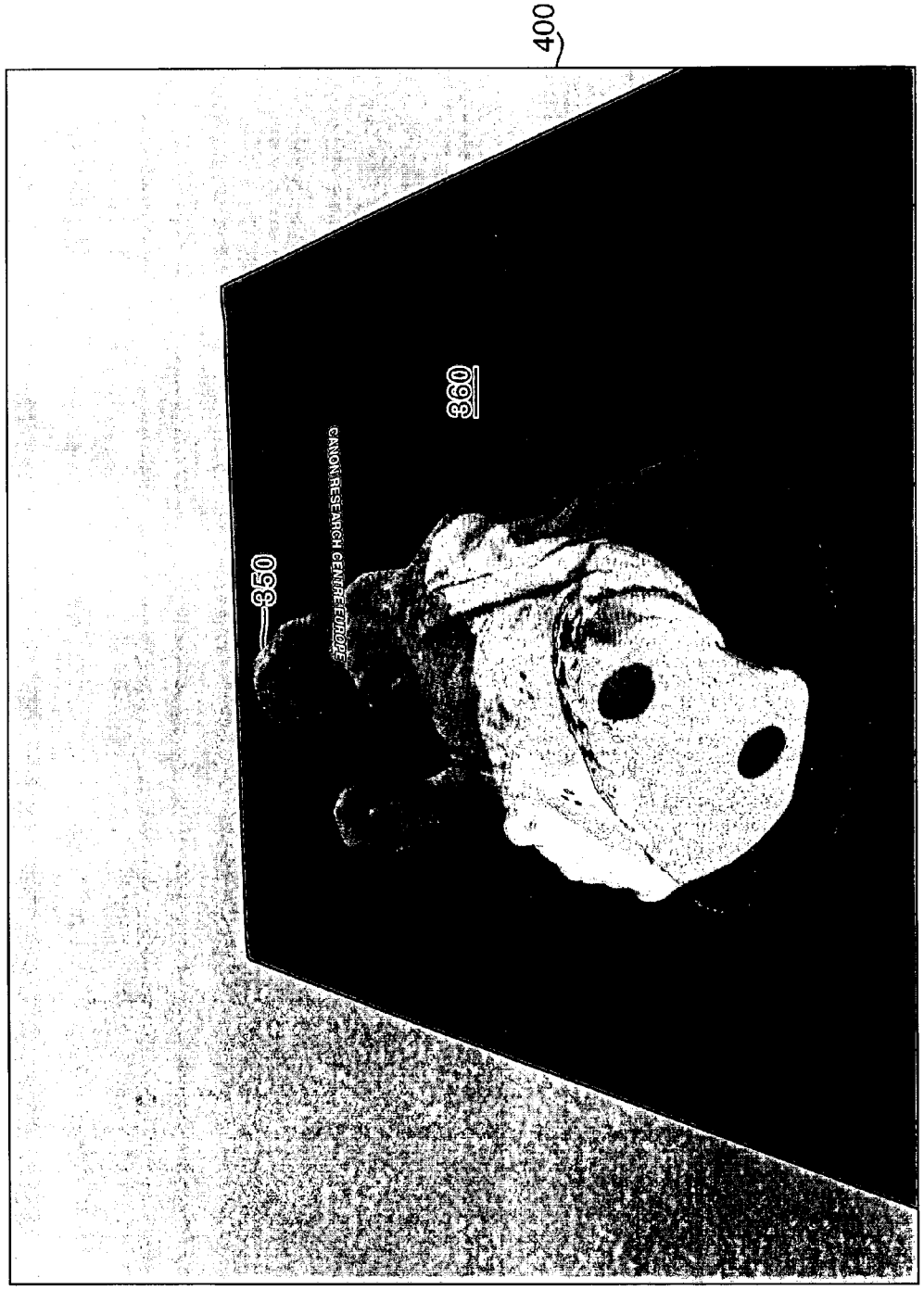
Figure 10B:
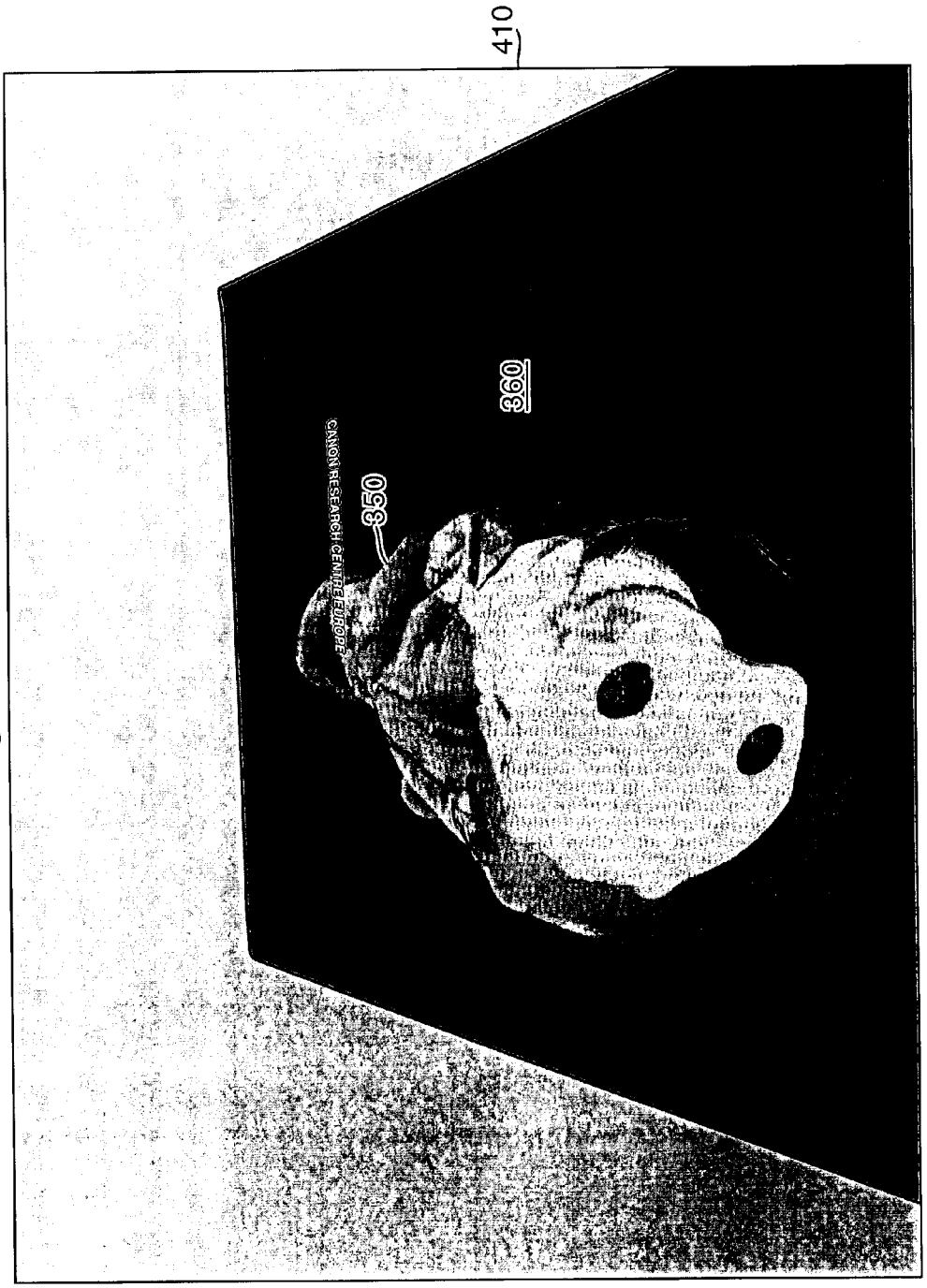
Figure 10C:
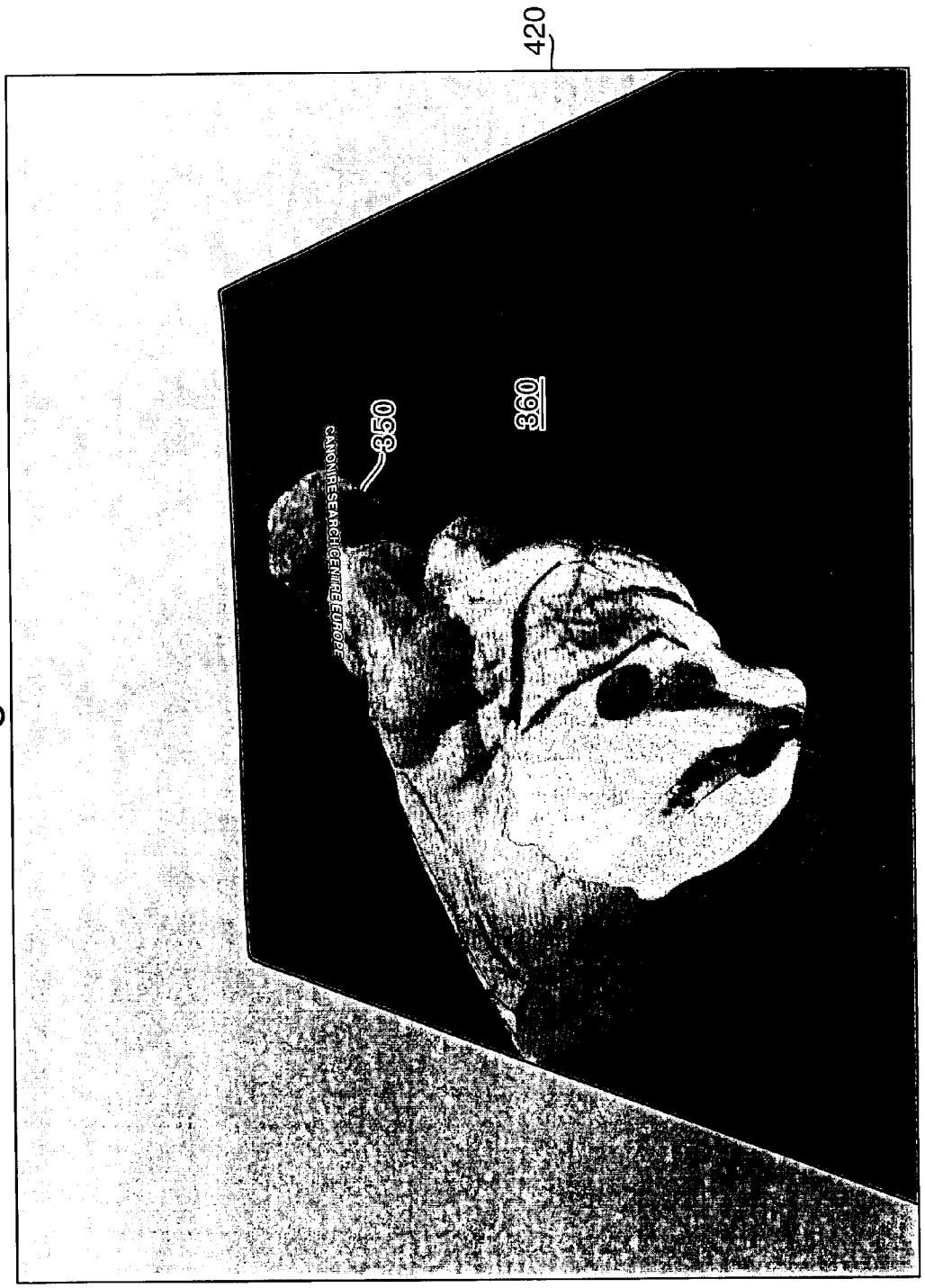
Figure 10D:
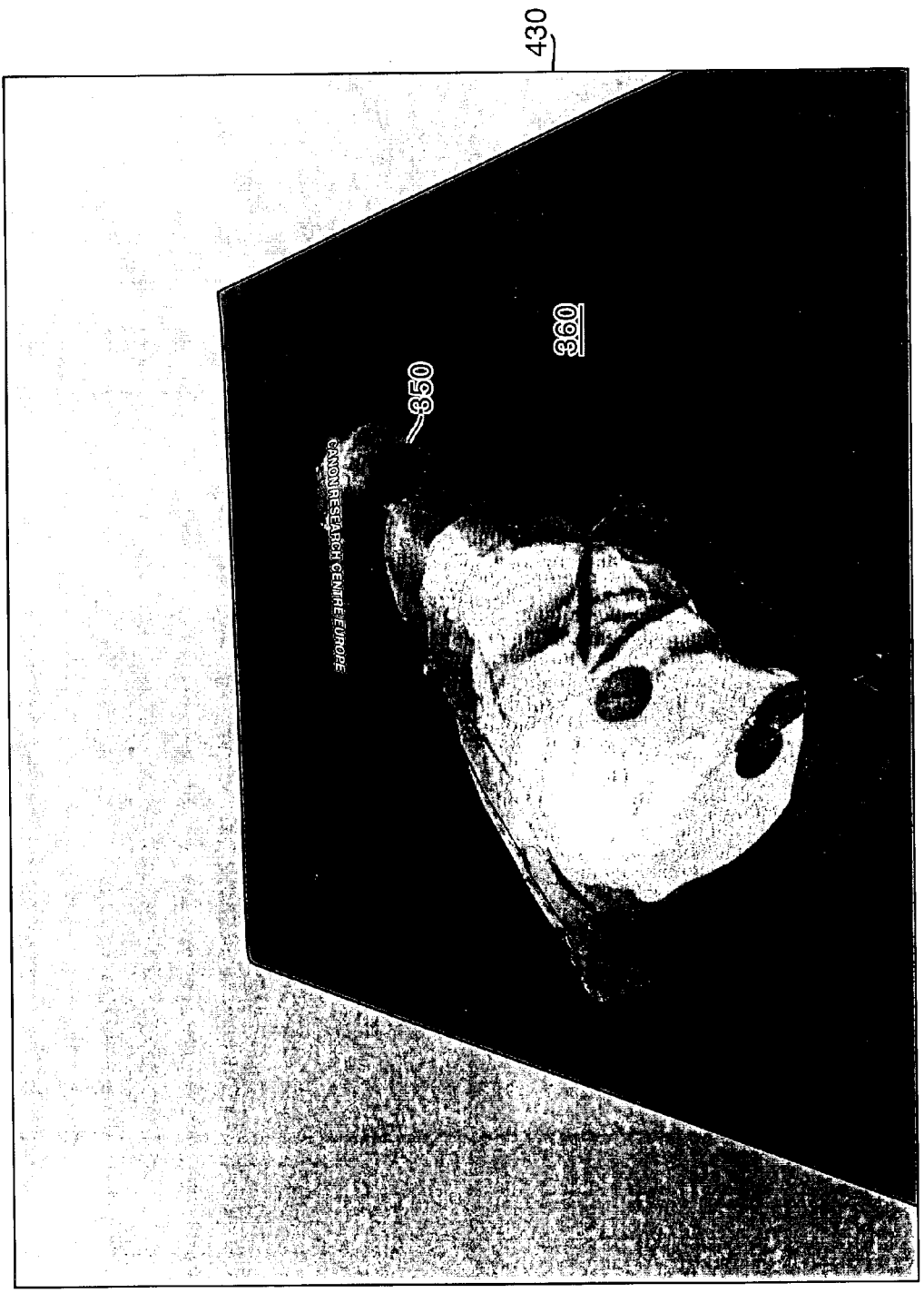
Figure 10E:
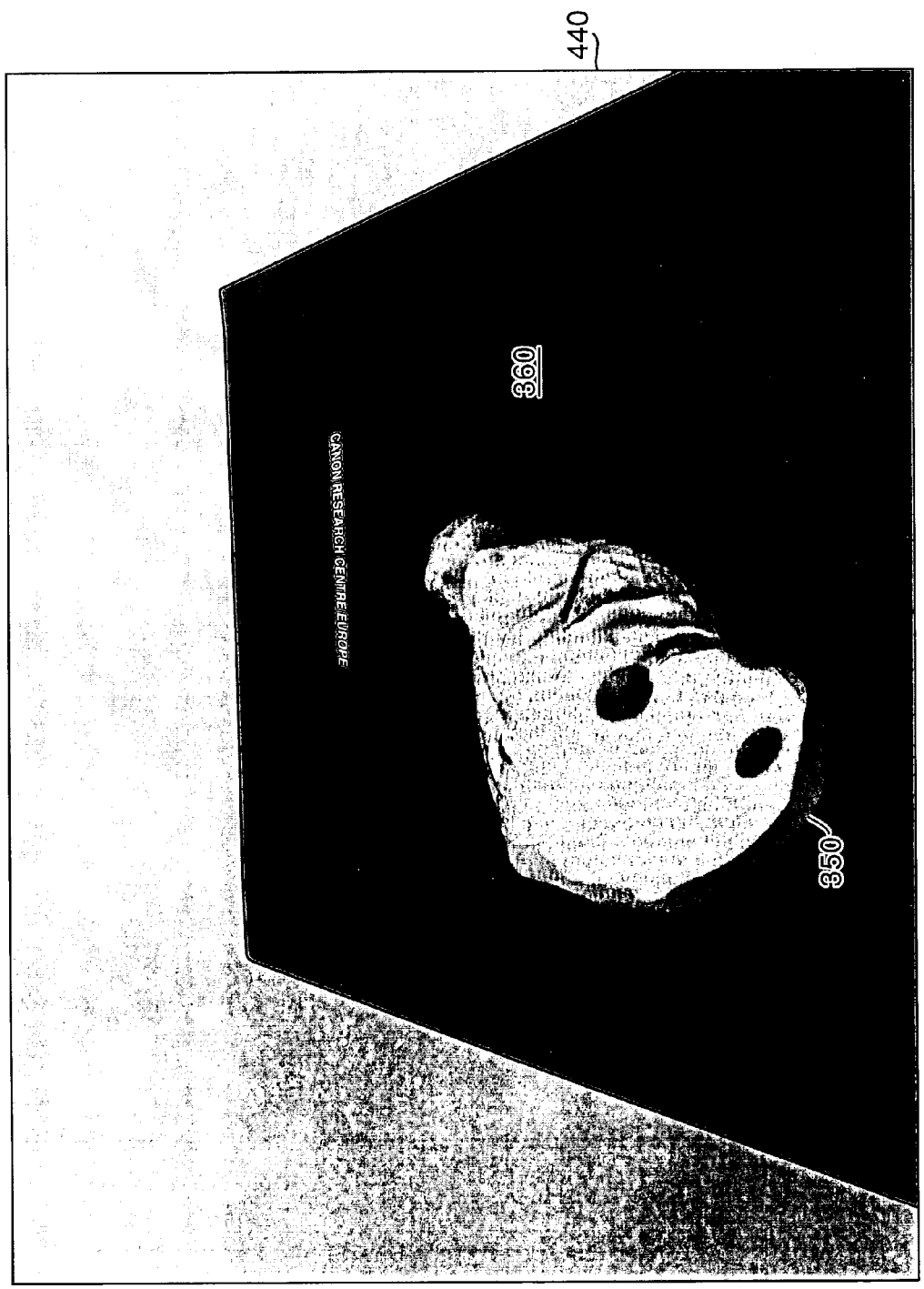
Figure 10F:
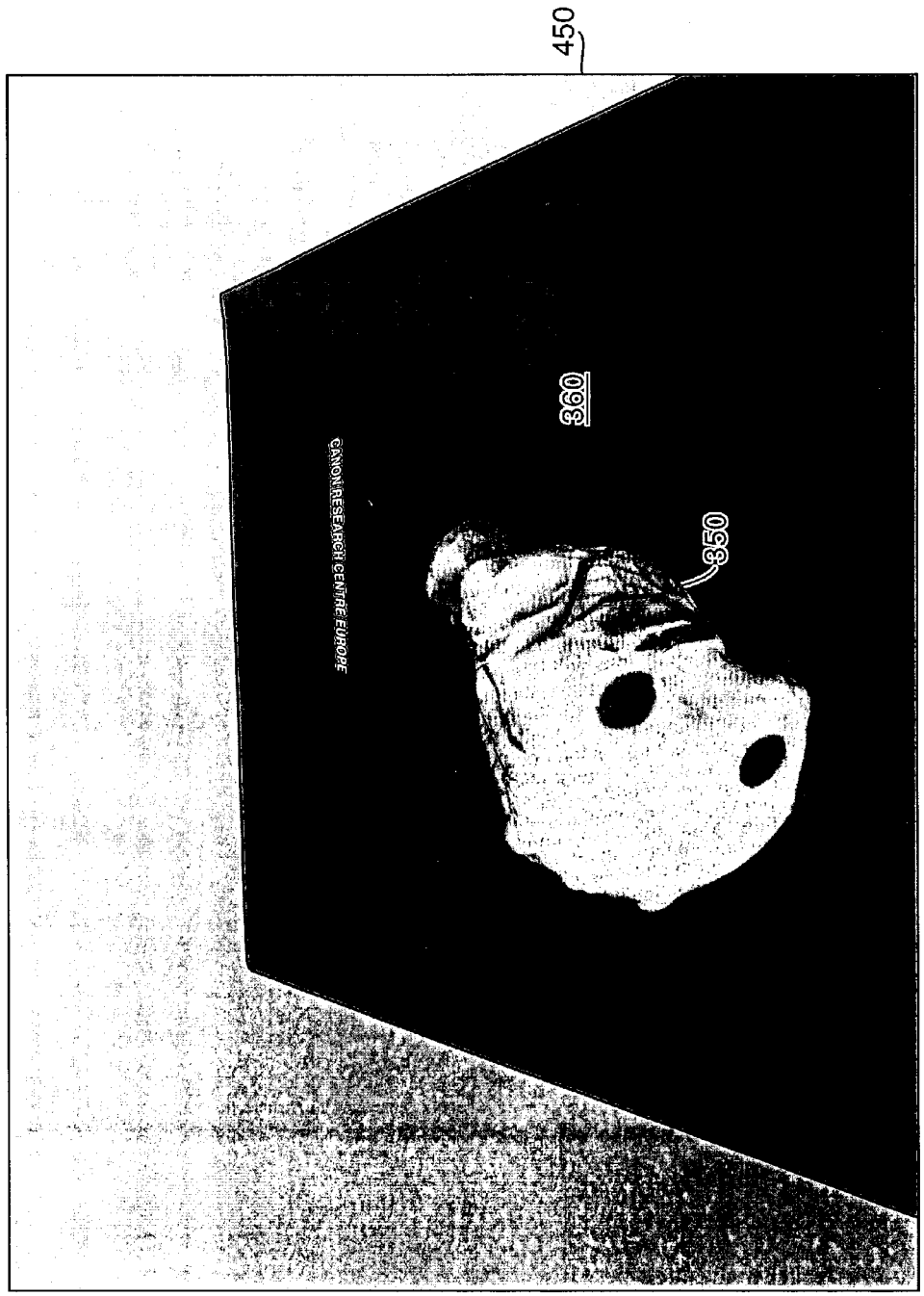
Figure 11:
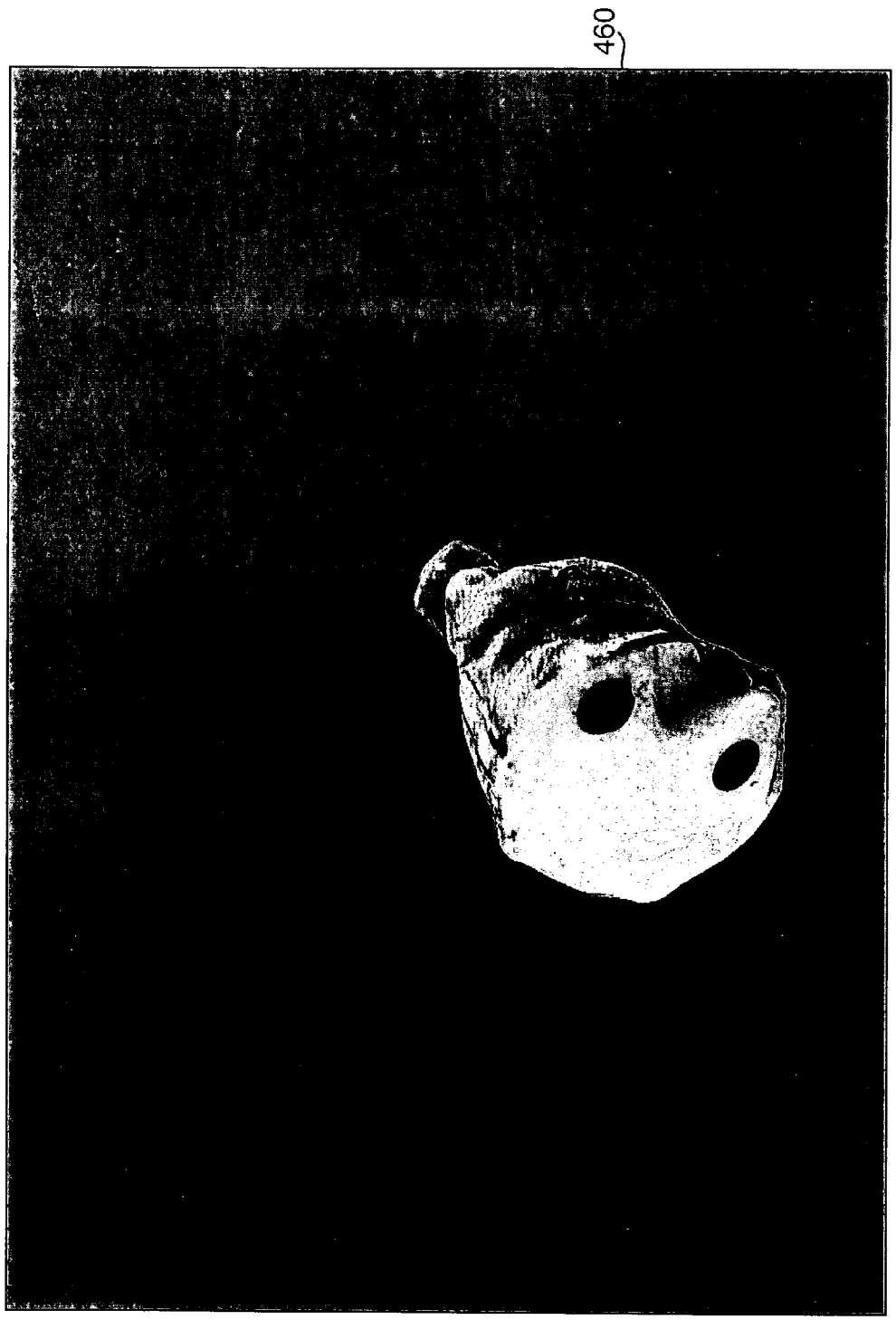

FIGS. 10a to 10f show examples of the overlaid images generated and displayed at steps S8-10 and S8-12 in FIG. 8 as the user rotates and translates the virtual camera to register the 3D computer surface shape model with the additional image for texture data generation; and FIG. 11 shows an image of the 3D computer model to illustrate the texture data generated for the base of the model at step S4-16 in FIG. 4.

Figure 1:
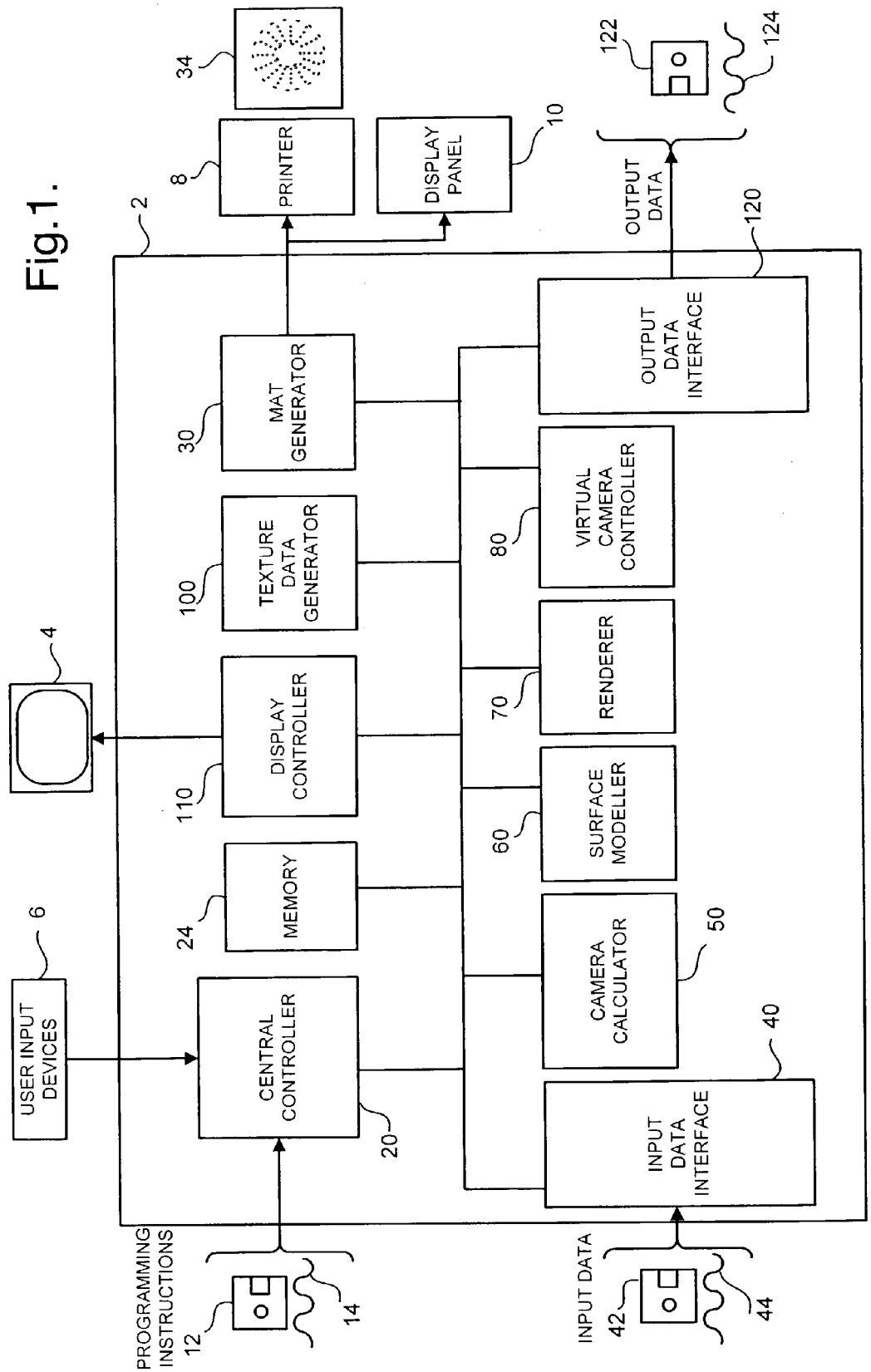

Referring to FIG. 1, an embodiment of the invention comprises a processing apparatus 2, such as a personal computer (PC), containing, in a conventional manner, one or more processors, memories, graphics cards etc, together with a display device 4, such as a conventional personal computer monitor, user input devices 6, such as a keyboard, mouse etc, a printer 8, and a display panel 10 comprising a flat panel having controllable pixels, such as the PL400 manufactured by WACOM.

The processing apparatus 2 is programmed to operate in accordance with programming instructions input, for example, as data stored on a data storage medium, such as disk 12, and/or as a signal 14 input to the processing apparatus 2, for example from a remote database, by transmission over a communication network (not shown) such as the Internet or by wireless transmission through the atmosphere, and/or entered by a user via a user input device 6 such as a keyboard.

As will be described in more detail below, the programming instructions comprise instructions to cause the processing apparatus 2 to become configured to generate data defining a 3D computer model of the surface shape of a subject object by processing input data defining images of the subject object recorded at different positions and orientations relative thereto, and to generate texture data for the 3D computer model from image data of at least one further image of the subject object, the further image not itself having been used to generate the 3D computer model. The further image may show part(s) of the subject object not visible in the images used to generate the surface model, so that texture data for these parts may be generated which faithfully represents the surface of the subject object. More particularly, the programming instructions comprise instructions to cause the processing apparatus 2 to become operable to process the image data for a first set of images to calculate the relative positions and orientations at which the images were recorded (thereby generating a first registered set of images), to generate data defining a 3D computer model of the surface shape of the subject object using the registered images from the first set, to register the 3D computer model with one or more further images of the subject object, and to generate texture data for the 3D computer model, including texture data representing features visible only in the further image(s) as well as those visible in the images in the first set.

In this embodiment, the subject object is imaged on a calibration object (a two-dimensional photographic mat in this embodiment) which has a known pattern of features thereon. The input images to be used to generate the 3D computer surface model comprise images recorded at different positions and orientations of the subject object and the calibration object in a fixed respective configuration (that is, the position and orientation of the subject object relative to the calibration object is the same for the images). The positions and orientations at which the input images were recorded are calculated by detecting the positions of the features of the calibration object pattern in the images.

As will be explained in detail below, the programming instructions comprise instructions to cause processing apparatus 2 to become operable to register the 3D computer model with each further image by displaying the further image as a stationary background image, providing a 3D browser for a user to view the 3D computer model by controlling a virtual camera, displaying images of the 3D computer model from the virtual camera in semi-transparent form overlaid on the background image in real-time as the user controls the virtual camera, and storing the viewing parameters of the virtual camera as the viewing parameters of the further image when the user inputs a signal indicating that the view of the 3D computer model from the virtual camera is sufficiently the same as the displayed further image.

When programmed by the programming instructions, processing apparatus 2 can be thought of as being configured as a number of functional units for performing processing operations. Examples of such functional units and their interconnections are shown in FIG. 1. The units and interconnections illustrated in FIG. 1 are, however, notional, and are shown for illustration purposes only to assist understanding; they do not necessarily represent units and connections into which the processor, memory etc of the processing apparatus 2 actually become configured.

Referring to the functional units shown in FIG. 1, a central controller 20 is arranged to process inputs from the user input devices 6, and also to provide control and processing for the other functional units.

Memory 24 is provided to store the operating instructions for the processing apparatus, to store data input to the processing apparatus, and to store data generated by central controller 20 and the other functional units.

Mat generator 30 is arranged to generate control signals to control printer 8 or to control display panel 10 to print a calibration pattern on a recording medium such as a piece of paper to form a printed "photographic mat" 34 or to display the calibration pattern on display panel 10 to display a photographic mat. As will be described in more detail below, the photographic mat comprises a predetermined calibration pattern of features, and the subject object for which a 3D computer model is to be generated is placed on the printed photographic mat 34 or on the display panel 10 on which the calibration pattern is displayed. Images of the subject object and the calibration pattern are then recorded and input to the processing apparatus 2 for use in generating the 3D computer surface shape model. These images comprise images recorded from different positions and orientations relative to the subject object and calibration pattern, with the position and orientation of the subject object relative to the calibration pattern being the same for all images to be used to generate the 3D computer surface shape model.

Mat generator 30 is arranged to store data defining the calibration pattern of features printed or displayed on the photographic mat for use by the processing apparatus 2 when calculating the positions and orientations at which the input images were recorded. More particularly, in this embodiment, mat generator 30 is arranged to store data defining the pattern of features together with a coordinate system relative to the pattern of features (which, in effect, defines a reference position of orientation of the calibration pattern), and processing apparatus 2 is arranged to calculate the positions and orientations at which the input images were recorded in the defined coordinate system (and thus relative to the reference position and orientation). In this way, the recording positions and orientations of the input images are calculated relative to each other, and accordingly a registered set of input images is generated.

In this embodiment, the calibration pattern on the photographic mat comprises spatial clusters of features, for example as described in co-pending U.S. application Ser. No. 10/129,626 (the full contents of which are incorporated herein by cross-reference) or any known pattern of features, such as a pattern of coloured dots, with each dot having a different hue/brightness combination so that each respective dot is unique (for example, as described in JP-A-9-170914), a pattern of concentric circles connected by radial line segments with known dimensions and position markers in each quadrant (for example, as described in "Automatic Reconstruction of 3D Objects Using a Mobile Camera" by Niem in Image and Vision Computing 17, 1999, pages 125–134), or a pattern comprising concentric rings with different diameters (for example as described in "The Lumigraph" by Gortler et al in Computer Graphics Proceedings, Annual Conference Series, 1996 ACM-0-89791-764-4/96/008).

In the remainder of the description of this embodiment, it will be assumed that the calibration pattern is printed by printer 8 on a recording medium (in this embodiment, a sheet of paper) to generate a printed photographic mat 34, although, as mentioned above, the calibration pattern could be displayed on display panel 10 instead.

Input data interface 40 is arranged to control the storage of input data within processing apparatus 2. The data may be input to processing apparatus 2 for example as data stored on a storage device, such as disk 42, as a signal 44 transmitted to the processing apparatus 2, or using a user input device 6. In this embodiment, the input data defines a plurality of images of the subject object on the photographic mat 34 recorded at different positions and orientations relative thereto. The input images comprise a set of images to be processed to generate a 3D computer model of the surface shape of the subject object, the images in the set being such that the position and orientation of the subject object relative to the calibration pattern is the same for all images in the set. The input image data also comprises image data for at least one further image of the subject object (which may or may not show the calibration pattern) to be processed to generate texture data for the 3D computer model but not to be processed to generate the 3D computer model itself. In addition, in this embodiment, the input data also includes data defining the intrinsic parameters of the camera which recorded the input images, that is, the aspect ratio, focal length, principal point (the point at which the optical axis intersects the imaging plane), first order radial distortion coefficient, and skew angle (the angle between the axes of the pixel grid; because the axes may not be exactly orthogonal).

The input data defining the input images may be generated, for example, by downloading pixel data from a digital camera which recorded the images, or by scanning photographs using a scanner (not shown).

The input data defining the intrinsic camera parameters may be input by a user using a user input device 6.

Camera calculator 50 is arranged to process each input image in the set to be used to generate the 3D computer surface shape model to detect the positions in the image of the features in the calibration pattern of the photographic mat 34 and to calculate the position and orientation of the camera relative to the photographic mat 34 when the image was recorded. In this way, because the position and orientation of each input image is calculated relative to the same calibration pattern, the positions and orientations of the input images in the set are defined in a common coordinate system and therefore a registered set of input images is generated.

Surface modeller 60 is arranged to process the image data of the images in the set to be used to generate the 3D computer surface shape model and the camera positions and orientations calculated by camera calculator 50 for the images in the set, to generate data defining a 3D computer model comprising a polygon mesh representing the surface of the subject object.

Renderer 70 is arranged to generate data defining an image of the 3D computer surface model generated by surface modeller 60 in accordance with a virtual camera, the processing performed by renderer 70 being conventional rendering processing and including rendering texture data generated by processing apparatus 2 onto the 3D computer surface model.

Virtual camera controller 80 is responsive to instructions input by a user using a user input device 6, to control the virtual camera used by renderer 70 to generate images of the 3D computer model.

Texture data generator 100 is arranged to generate texture data from the input images for rendering by renderer 70 onto the 3D computer model generated by surface modeller 60.

Display controller 110 is arranged to control display device 4 to display images and instructions to the user during the processing by processing apparatus 2. In addition, display controller 110 is arranged to control display device 4 to display the image data generated by renderer 70 showing images of the 3D computer surface model rendered with the texture data generated by texture data generator 100.

Output data interface 120 is arranged to control the output of data from processing apparatus 2. In this embodiment, the output data defines the 3D computer surface shape model generated by surface modeller 70 and the texture data generated by texture data generator 100. Output data interface 120 is arranged to output the data for example as data on a storage device, such as disk 122, and/or as a signal 124. A recording of the output data may be made by recording the output signal 124 either directly or indirectly using recording apparatus (not shown).

Figure 2:
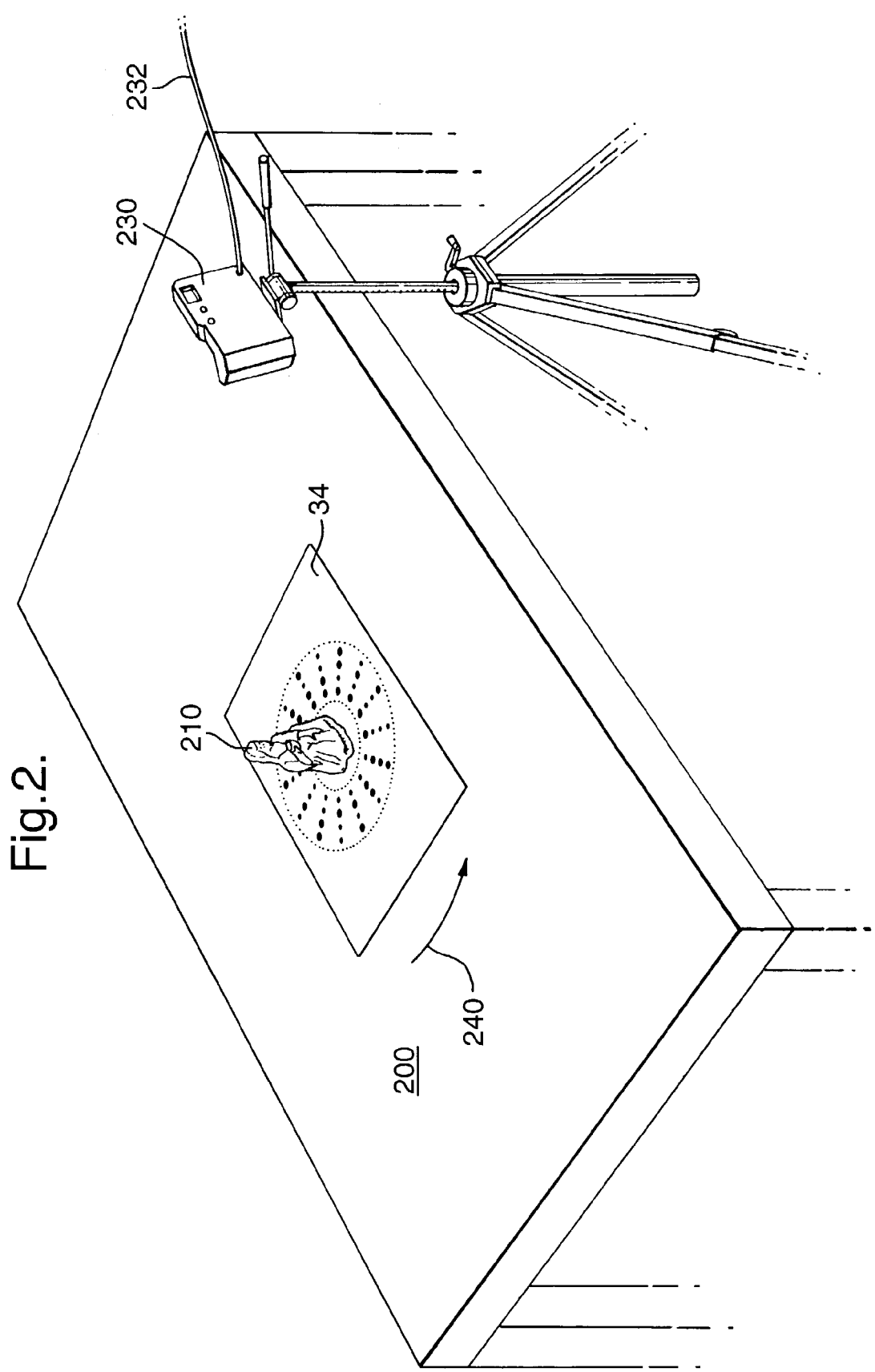
FIG. 2 illustrates the recording of images of a subject object for use in generating a 3D computer surface shape model of the subject object.

Referring now to FIG. 2, the recording of a set of input images for processing by processing apparatus 2 to generate a 3D computer surface shape model will be described.

The printed photographic mat 34 is placed on a surface 200, and the subject object 210 for which a 3D computer model is to be generated, is placed substantially at the centre of the photographic mat 34 so that the subject object 210 is surrounded by the features making up the calibration pattern on the mat.

Images of the subject object 210 and photographic mat 34 are recorded at different positions and orientations relative thereto to show different parts of the subject object 210 using a digital camera 230. In this embodiment, data defining the images recorded by the camera 230 is input to the processing apparatus 2 as a signal 44 along a wire 232.

More particularly, in this embodiment, camera 230 remains in a fixed position, and the photographic mat 34 with the subject object 210 thereon is moved (translated) and rotated (for example, in the direction of arrow 240) on surface 200 and photographs of the object 210 at different positions and orientations relative to the camera 230 are recorded. During the rotation and translation of the photographic mat 34 on surface 200 to record the images to be used to generate the 3D computer surface shape model, the subject object 210 does not move relative to the mat 34, so that the position and orientation of the subject object 210 relative to the calibration pattern is the same for each image in the set.

Images of the top of the subject object 210 are recorded by removing the camera 230 from the tripod and imaging the subject object 210 from above.

Figure 3:
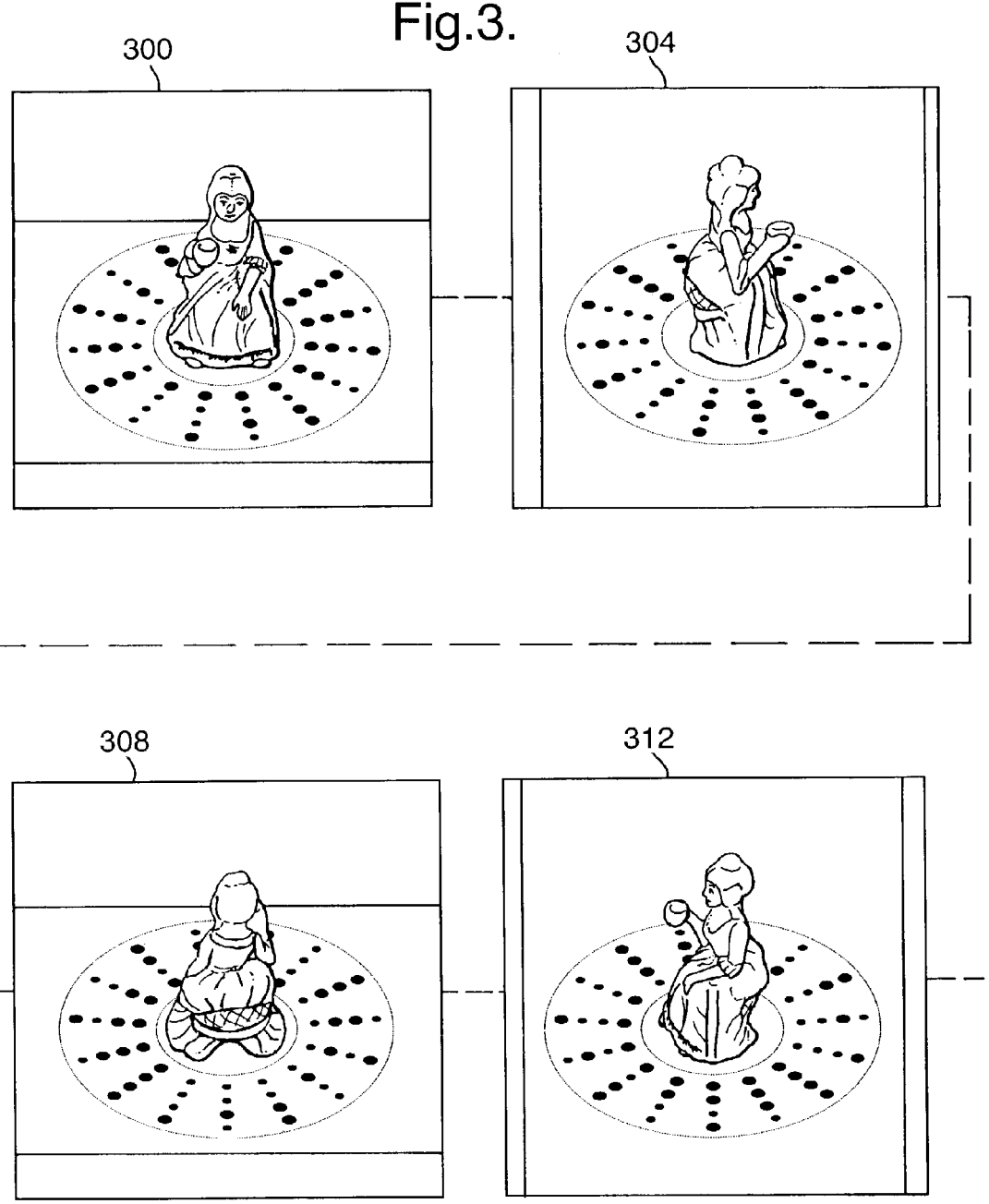
FIG. 3 shows examples of images of the subject object which are input to the processing apparatus in FIG. 1 and processed to generate a 3D computer surface shape model of the subject object.

FIG. 3 shows examples of images 300, 304, 308 and 312 from a set of images defined by data input to processing apparatus 2 for processing to generate the 3D computer surface shape model, the images showing the subject object 210 and photographic mat 34 in different positions and orientations relative to camera 230.

FIG. 4 shows the processing operations performed by processing apparatus 2 to process the input data in this embodiment.

Referring to FIG. 4, at step S4-2, central controller 20 causes display controller 110 to display a message on display device 4 requesting the user to input data for processing to generate a 3D computer surface shape model.

At step S4-4, data input by the user in response to the request at step S4-2 is stored in memory 24 under the control of input data interface 40. More particularly, as described above, in this embodiment, the input data comprises data defining images of the subject object 210 and photographic mat 34 recorded at different relative positions and orientations, together with data defining the intrinsic parameters of the camera 230 which recorded the input images.

At step S4-6, camera calculator 50 processes the input image data and the intrinsic camera parameter data stored at step S6-4, to determine the position and orientation of the camera 230 relative to the calibration pattern on the photographic mat 34 (and hence relative to the subject object 210) for each input image. This processing comprises, for each input image, detecting the features in the image which make up the calibration pattern on the photographic mat 34, comparing the positions of the features in the image to the positions of the features in the stored pattern for the photographic mat, and calculating therefrom the position and orientation of the camera 230 relative to the mat 34 when the image was recorded. The processing performed by camera calculator 50 at step S4-6 depends upon the calibration pattern of features used on the photographic mat 34. Accordingly, suitable processing is described, for example, in co-pending U.S. patent application Ser. No. 10/129,626, JP-A-9-170914, "Automatic Reconstruction of 3D Objects Using a Mobile Camera" by Niem in Image and Vision Computing 17, 1999, pages 125–134, and "The Lumigraph" by Gortler et al in Computer Graphics Proceedings, Annual Conference Series, 1996 ACM-0-89791-764-4/96/008. It should be noted that the positions of the features of the calibration pattern in each input image may be identified to processing apparatus 2 by the user (for example, by pointing and clicking on each calibration pattern feature in displayed images) rather than being detected independently by camera calculator 50 using the image processing techniques in the listed references.

The result of the processing by camera calculator 50 at step S4-6 is that the position and orientation of each input image has now been calculated relative to the calibration pattern on the photographic mat 34, and hence the images have been registered to each other.

At step S4-8, surface modeller 60 generates data defining a 3D computer model comprising a polygon mesh representing the surface shape of the subject object 210 by processing the input images and the position and orientation data generated by camera calculator 50.

In this embodiment, the processing by surface modeller 60 comprises processing each input image stored at step S4-4 to segment image data representing the subject object 210 from other image data ("background" image data), and then processing the resulting segmentations to generate the polygon mesh representing the surface shape of the subject object 210.

In this embodiment, the processing to segment the image data is performed using a conventional image segmentation method, for example as described in part 2.2 of Annex A of GB-A-2358307.

The segmentation processing generates data defining the silhouette of the subject object 210 in each input image. Each Silhouette defines, together with the focal point position of the camera when the image in which the silhouette is situated was recorded, an infinite cone in 3D space which touches the surface of the subject object 210 at (as yet unknown) points in the 3D space (because the silhouette defines the outline of the subject object surface in the image).

The processing performed by surface model at 60 in this embodiment to generate the polygon mesh representing the surface shape of the subject object 210 comprises processing to determine the volume of 3D space defined by the intersection of the infinite cones defined by all of the silhouettes in the input images, and to represent the intersection volume by a mesh of connected planar polygons.

This processing may be carried out using the technique described in the proprietor's co-pending co-pending U.S. patent application Ser. No. 10/164,435 (US2002-0190982A1) (the full contents of which are incorporated herein by cross-reference), or may be carried out using a conventional method, for example such as that described in "A Volumetric Intersection Algorithm for 3D-Reconstruction Using a Boundary-Representation" by Martin Löhlein at http://i31www.ira.uka.de/diplomarbeiten/da_martin_loehlein/Reconstruction.html or as described in "An Algorithm for Determining the Intersection of Two Simple Polyhedra" by M. Szilvasi-Nagy in Computer Graphics Forum 3 (1984) pages 219–225.

Alternatively, surface modeller 60 may perform shape-from-silhouette processing for example as described in "Looking to build a model world: automatic construction of static object models using computer vision" by Illingsworth and Hilton in Electronics and Communication Engineering Journal, June 1998, pages 103–113, or "Automatic reconstruction of 3D objects using a mobile camera" by Niem in Image and Vision Computing 17 (1999) pages 125–134. In these methods the intersections of the silhouette cones are calculated and used to generate a "volume representation" of the subject object made up of a plurality of voxels (cuboids). More particularly, 3D space is divided into voxels, and the voxels are tested to determine which ones lie inside the volume defined by the intersection of the silhouette cones. Voxels inside the intersection volume are retained to define a volume of voxels representing the subject object. The volume representation is then converted into a surface model comprising a mesh of connected polygons.

The result of the processing at step S4-8 is a polygon mesh representing the surface of the subject object 210. Because the polygon mesh 390 is generated using the input images 300–316 from the input set of images as described above, the polygon mesh is registered to the input images in the set (that is, its position and orientation is known relative to the positions and orientations of the input images 300–316).

At step S4-10, texture data generator 100 processes the input images to generate texture data therefrom for the 3D computer model generated at step S4-8.

More particularly, in this embodiment, texture data generator 100 performs processing in a conventional manner to select each polygon in the 3D computer model generated at step S4-8 and to find the input image "i" which is most front-facing to the selected polygon. That is, the input image is found for which the value $\hat{n}t.\hat{v}i$ is largest, where $\hat{n}t$ is the polygon normal, and $\hat{v}i$ is the viewing direction for the "i"th image. This identifies the input image in which the selected surface polygon has the largest projected area.

The selected surface polygon is then projected into the identified input image, and the vertices of the projected polygon are used as texture coordinates to define an image texture map.

Other techniques that may be used by texture data generator 100 to generate texture data at step S4-10 are described in co-pending UK patent applications 0026331.9 (GB-A-2,369,541) and 0026347.5 (GB-A-2,369,260), and co-pending U.S. application Ser. No. 09/981,844 (US2002-0085748A1) the full contents of which are incorporated herein by cross-reference.

The result of performing the processing described above is a 3D computer model comprising a polygon mesh modelling the surface shape of the subject object 210, together with texture coordinates defining image data from the input images to be rendered onto the model.

Figure 5:
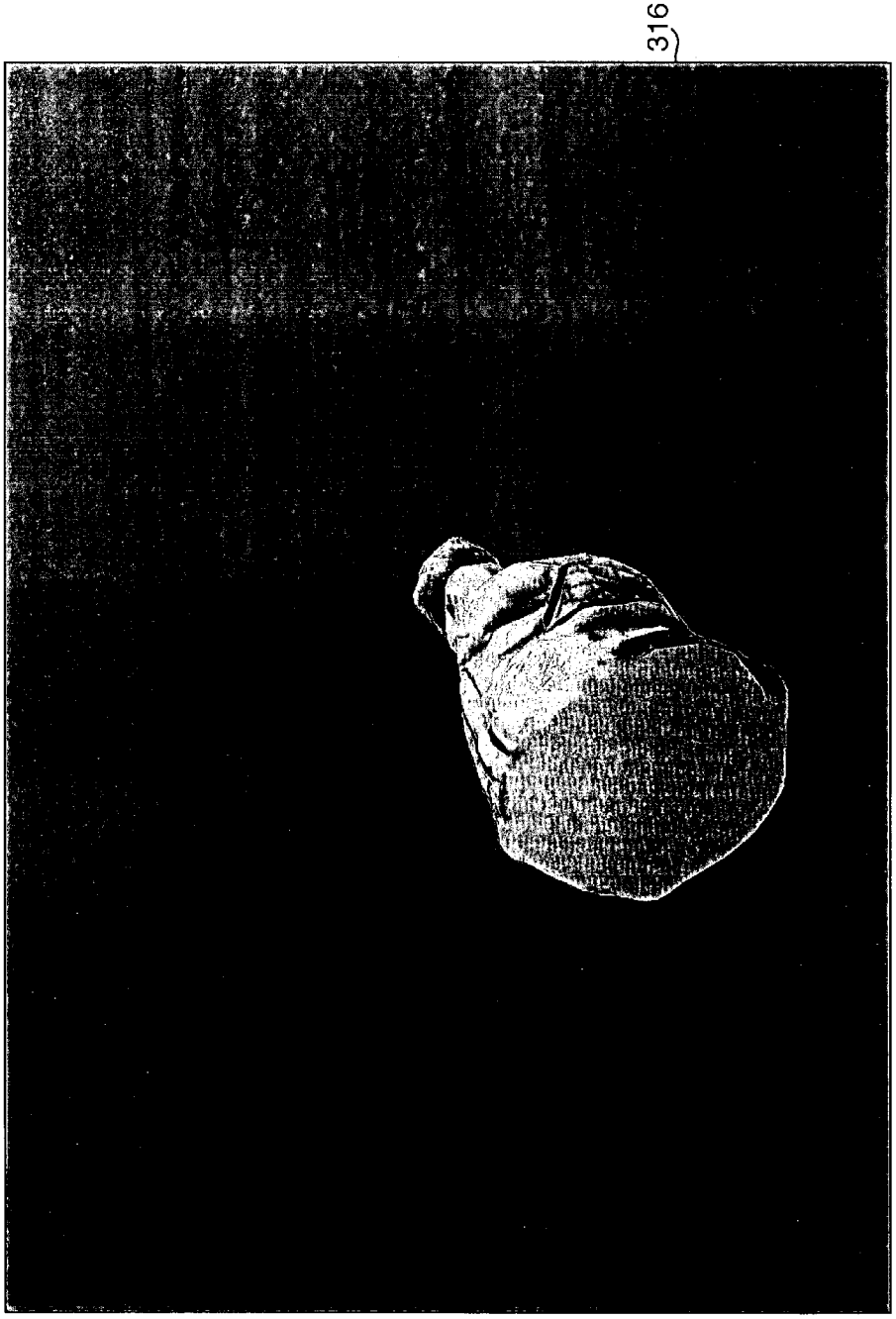
FIG. 5 shows an image of the 3D computer model generated at steps S4-8 and S4-10 in FIG. 4 to illustrate flat shading of the base of the model.

However, referring again to FIGS. 2 and 3, some parts of the subject object 210 are not visible in the images recorded and input to processing apparatus 2 for processing at steps S4-6 to S4-10. More particularly, in the example shown in FIGS. 2 and 3, the base of the subject object 210 is not visible. Consequently, although the base of the subject object 210 will be modelled by the polygon mesh as a flat plane, no texture data will be available from the input images for the base. Therefore, the base will be flat-shaded (sometimes referred to as "constant shading") without texture data in images of the 3D computer model, for example as shown in example image 316 in FIG. 5. That is, a respective single intensity value is used to shade each polygon representing the flat plane of the base, so that the respective shading of each polygon making up the base is constant.

Accordingly, in this embodiment, at steps S4-12 to S4-16, at least one additional input image showing the part(s) of the subject object 210 not visible in the input images processed at steps S4-6 to S4-10 is input to processing apparatus 2, and processing is performed to register each additional input image with the 3D computer surface shape model generated at step S4-8 (that is, to determine the relative position and orientation of the 3D computer surface model and additional input image such that the additional input image projects onto the 3D computer surface model with the correct alignment and size). Additional texture data for the 3D computer surface shape model is then generated from the image data of the additional image(s).

Figure 6:
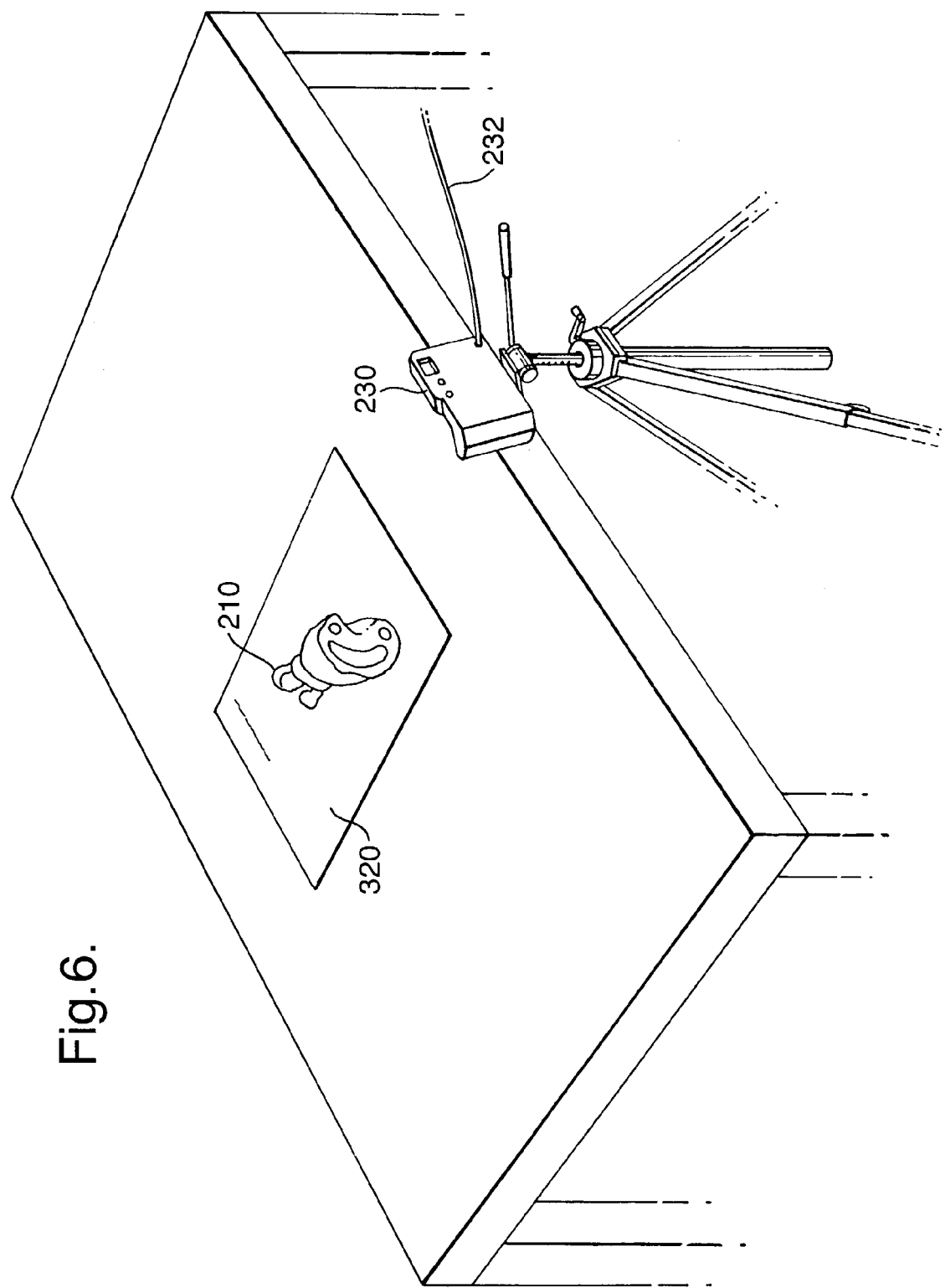
FIG. 6 illustrates the recording of an image of the subject object for use in generating texture data for the base of the 3D computer surface shape model.

FIG. 6 illustrates an example of the recording of an additional image to generate texture data for the base of the polygon mesh.

Referring to FIG. 6, the subject object 210 need no longer be imaged on the photographic mat 34. Instead, in the example illustrated, the subject object 210 is placed on its side on a coloured sheet of paper 320, with the base of the subject object 210 facing the camera 230. The position and orientation of the camera 230 has been changed from that illustrated in FIG. 2 in order to provide the required view of the base of the subject object 210.

Figure 7:
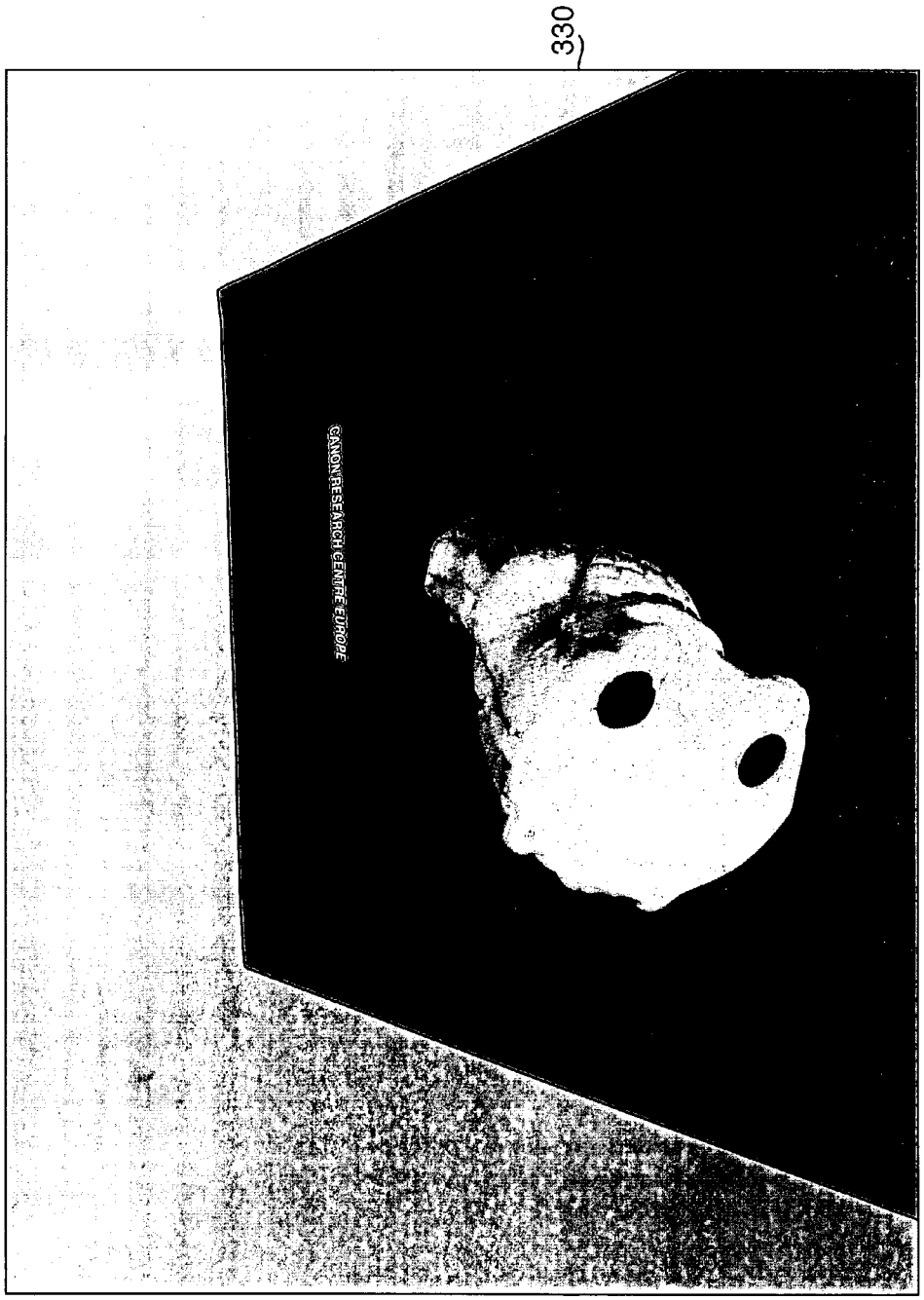
FIG. 7 shows an example of an image of the subject object input to the processing apparatus in FIG. 1 and processed to generate texture data for the base of the 3D computer surface shape model.

FIG. 7 shows an example of an image 330 recorded with the arrangement shown in FIG. 6 for use in generating texture data for the base of the polygon mesh generated at step S4-8.

The processing operations performed at steps S4-12 to S4-16 to process the additional input image(s) to generate the texture data for the base of the polygon mesh will now be described in detail.

At step S4-12, central controller 20 causes display controller 110 to display a message on display device 4 enquiring whether there are any additional images to be used for texture data generation.

If, in response, the user inputs a signal using a user input device 6 indicating that no additional images are to be used for texture data generation, then processing proceeds to step S4-18.

Alternatively, if the user inputs a signal using a user input device 6 indicating that at least one additional input image is to be used for texture data generation, then the processing proceeds to step S4-14, at which each additional image is registered with the polygon mesh previously generated at step S4-8.

FIG. 8 shows the processing operations performed at step S4-14 to register the additional images with the polygon mesh.

Referring to FIG. 8, at step S8-2, central controller 20 causes display controller 110 to display a message on display device 4 requesting the user to input the image data defining each additional image to be processed for texture data generation.

At step S8-4, image data input by the user in response to the request at step S8-2 is stored in memory 24 under the control of input data interface 40.

At step S8-6, central controller 20 causes display controller 110 to display the next additional image as a stationary backdrop image on display device 4 (this being the first additional image the first time step S8-6 is performed). Thus, for example, image 330 shown in FIG. 7 is displayed as a backdrop image on display device 4.

At step S8-8, renderer 70 sets the values of the intrinsic parameters (focal length etc) of the virtual camera to be the same as those stored at step S4-4 and then generates image data defining an image of the polygon mesh generated at step S4-8 rendered with texture data generated at step S4-10, in accordance with a predetermined virtual camera viewing position and direction. Display controller 110 then controls display device 4 to display the generated image of the textured polygon mesh overlaid on top of the backdrop image displayed at step S8-6. In this embodiment, the textured polygon mesh is displayed in semi-transparent form so that the backdrop image is visible therethrough.

To achieve the semi-transparent display of the polygon mesh, in this embodiment, the polygon mesh is rendered onto the backdrop image, and a modified value is then calculated for each pixel in the backdrop image onto which the mesh projects (that is, each pixel at least partially inside the mesh). This is done for each pixel to be modified by taking the average of each of the pixel colour component values (R, G, B) in the backdrop image and each of the corresponding pixel colour component values (R, G, B) of the pixel in the rendered polygon mesh. That is, the average of the red value of the pixel in the backdrop image and the red value of the corresponding pixel in the rendered polygon mesh image is calculated to generate a combined red value for the pixel to be displayed, and similarly for the blue and green values. For each pixel outside the projected polygon mesh, the value of the pixel in the backdrop image is retained. In this way, the background surrounding the polygon mesh in the image generated by renderer 70 does not affect the backdrop image. (As an alternative, all pixels in the backdrop image may be modified irrespective of whether they are inside or outside the polygon mesh, such that each pixel value in the image displayed to the user comprises the average of the pixel value from the backdrop image and the pixel value in the rendered image generated by renderer 70.)

Figure 9:
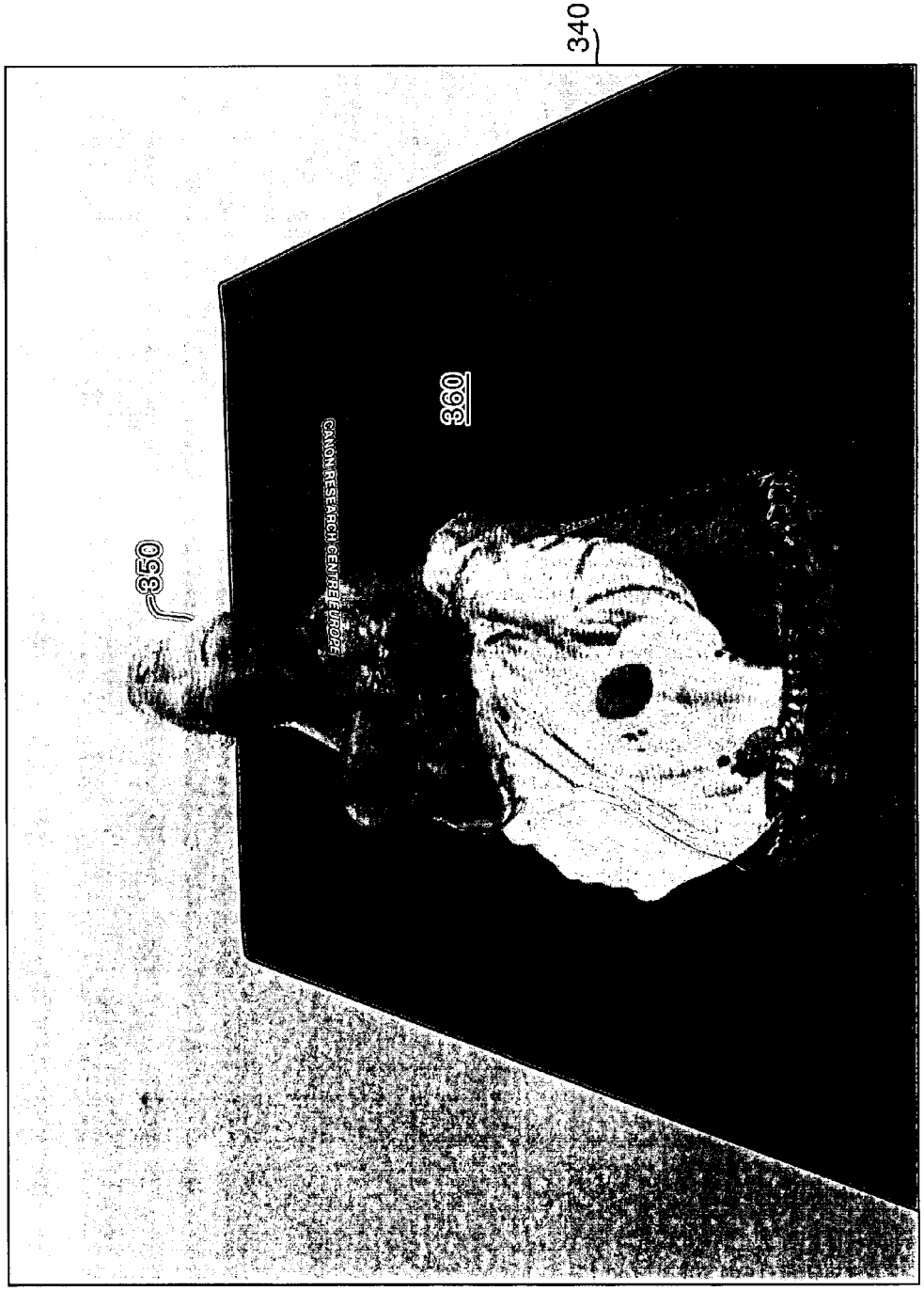
FIG. 9 shows an example of the overlaid images generated and displayed at step S8-8 in FIG. 8.

An example of the result of the processing performed at step S8-8 is illustrated in FIG. 9, which shows an image 340 in which image data of the textured polygon mesh 350 is displayed in semi-transparent form overlaid on the backdrop image data 360.

By displaying the image data of the textured polygon mesh in semi-transparent form in this way, the user can see both the backdrop image and the textured polygon mesh.

At step S8-10, virtual camera controller 80 moves the virtual camera used by renderer 70 to generate images of the polygon mesh to new positions and orientations relative to the polygon mesh in accordance with instructions input by a user using a user input device 6.

At step S8-12, in real-time as the relative position and orientation of the virtual camera and 3D polygon mesh is changed, renderer 70 generates updated image data showing the rendered polygon mesh from the virtual camera, and the updated image data is displayed on display device 4 in semi-transparent form overlaid on the backdrop image. The base of the polygon mesh is flat-shaded and is also displayed in semi-transparent form.

At step S8-14, virtual camera controller 80 determines whether further input signals have been received from the user to change the relative rotation and translation of the virtual camera and the 3D polygon mesh. Steps S8-10 to S8-14 are repeated until the until the user inputs a signal using a user input device 6 indicating that the relative rotation and translation of the virtual camera and polygon mesh are correct—that is, the virtual camera has been moved to a position and orientation which shows a view of the 3D polygon mesh which is substantially the same as the view of the subject object 210 shown in the additional image.

Thus, referring to FIGS. 10a to 10f, which illustrate images 400–450 displayed on display device 4 at step S8-12, the user is able to move the virtual camera relative to the polygon mesh so as to move the image 350 of the textured polygon mesh displayed on display device 4 to align it correctly with the image of the subject object 210 in the stationary backdrop image 360 (FIGS. 10a to 10d) and to change the size of the image 350 of the rendered polygon mesh so that its size is the same as that of the subject object 210 in the backdrop image (FIGS. 10e and 10f). In this way, the user can generate a view of the polygon mesh from the virtual camera which corresponds to the view of the subject object 210 recorded by the real camera 230. The display of the image 350 of the textured polygon mesh in semi-transparent form overlaid on the backdrop image enables the user to carry out this registration process accurately.

Referring again to FIG. 8, when instructions are received from the user at step S8-14 that the registration is complete, processing proceeds to step S8-16, at which the position and direction of the virtual camera used to generate the final image at step S8-12 (that is, the image in which the textured polygon mesh 350 is in registration with the subject object 210 of the backdrop image 360) are stored as the position and direction for the additional image selected at step S8-6. The stored data therefore defines the position and orientation of the additional image relative to the polygon mesh generated at step S8-8. In addition, the intrinsic camera parameters (focal length etc) previously stored at step S4-4 are stored as intrinsic parameters for the additional image.

At step S8-18, central controller 20 determines whether there is a further additional image to be processed to generate texture data. Steps S8-6 to S8-18 are repeated until each additional image has been processed in the way described above.

Referring again to FIG. 4, at step S4-16, texture data generator 100 regenerates texture data for the polygon mesh generated at step S4-8 taking into account the image data from each additional image registered with the polygon mesh as step S4-14. In this embodiment, the texture data generation at step S4-16 is performed in the same way as the texture data generation at step S4-10, described above.

As a result of the processing at step S4-16, texture data is generated for each surface of the polygon mesh not visible in the input images processed at steps S4-6 to S4-10 but which is visible in at least one additional image processed at steps S4-12 to S4-16.

Consequently, referring to FIG. 11, in an image 460 rendered from a viewing position and direction showing the base of the polygon mesh, the base will be accurately textured using texture data derived from the additional input image 330.

Referring again to FIG. 4, at step S4-18, output data interface 120 outputs data defining the 3D polygon mesh generated at step S4-8 and the texture data generated at steps S4-10 and S4-16. The output texture data may comprise data defining each of the input images to be used for texture data together with data defining the texture coordinates in the input images calculated for the polygons in the mesh. Alternatively, the pixel data to be used as texture data may be extracted from the input images and output.

The data is output from processing apparatus 2 for example as data stored on a storage device such as disk 122 or as a signal 124 (FIG. 1). In addition, or instead, renderer 70 may generate image data defining images of the 3D computer model generated at step S4-8 rendered with the texture data generated at steps S4-10 and S4-16 in accordance with a virtual camera defined by virtual camera controller 80 and controlled by the user. The images may then be displayed on display device 4.

Modifications and Variations

Many modifications and variations can be made to the embodiment described above within the scope of the claims.

For example, in the embodiment described above, each input image comprises a "still" images of the subject object 210. However, the input images may comprise frames of image data from a video camera.

In the embodiment described above, at step S4-4, data input by a user defining the intrinsic parameters of the camera is stored. However, instead, default values may be assumed for one, or more, of the intrinsic camera parameters, or processing may be performed to calculate the intrinsic parameter values in a conventional manner, for example as described in "Euclidean Reconstruction From Uncalibrated Views" by Hartley in Applications of Invariance in Computer Vision, Mundy, Zisserman and Forsyth eds, pages 237–256, Azores 1993.

In the embodiment described above, all of the input images processed at steps S4-6 to S4-10 to generate the 3D computer surface shape model and the initial texture data comprise images of the subject object 210 on the photographic mat 34, and the processing by camera calculator 50 comprises processing to match features from the calibration pattern on the photographic mat 34 in the images with stored data defining the calibration pattern. In this way, the position and orientation of each input image is calculated relative to a reference position and orientation of the calibration pattern. However, instead, camera calculator 50 may perform processing to match features of the calibration pattern between images (instead of between an image and a stored pattern) to determine the relative positions and orientations of the input images. For example, a technique as described with reference to FIGS. 53 and 54 in co-pending U.S. patent application Ser. No. 10/129,626 may be used. Alternatively, the input images processed at steps S4-6 to S4-10 may comprise images of the subject object 210 alone, without the photographic mat, and camera calculator 50 may perform processing at step S4-6 to calculate the relative positions and orientations of the input images by matching features on the subject object 210 itself (rather than matching features in the calibration pattern), for example as described in EP-A-0898245. In addition, camera calculator 50 may calculate the relative positions and orientations of the input images at step S4-6 using matching features in the images identified by the user (for example, by pointing and clicking to identify the position of the same feature in different images).

The input images stored at step S4-4 in the embodiment above may comprise images of the subject object 210 recorded with one or more cameras having a defined position and viewing direction. In this case, the imaging positions and orientations of the input images are known and may be stored at step S4-4. Camera calculator 50 and the processing at step S4-6 may then be omitted.

In the embodiment described above, surface modeller 60 generates the 3D computer surface shape model of the subject object 210 by segmenting the image data of each image to generate a silhouette and then processing the resulting silhouettes. However, instead, surface modeller 60 may generate the 3D computer surface shape model from the input images using other processing techniques. For example, the technique described in EP-A-0898245 may be used.

In the embodiment above, initial texture data is generated for the 3D computer surface shape model at step S4-10 before steps S4-12 and S4-14 are performed. In this way, the images of the 3D computer model generated and displayed at steps S8-8 and S8-12 when step S4-14 is performed may comprise images of the polygon mesh onto which the generated texture data is rendered. However, step S4-10 may be omitted and all texture data generation may be performed at step S4-16. In this case, the images of the polygon mesh generated and displayed at step S8-8 and step S8-12 may comprise images of the polygon mesh with flat shading (sometimes referred to as constant shading).

In the embodiment above, processing is performed at step S8-2 to request the user to enter image data for each additional image to be used for texture data generation, and the input image data is stored at step S8-4. However, this results in an interruption of the processing by processing apparatus 2 while the user responds to the request at step S8-2 and enters the image data for the additional image(s). Accordingly, instead, steps S8-2 and S8-4 may be performed as part of steps S4-2 and S4-4 at the start of processing by processing apparatus 2. In this way, each additional image to be used for texture data generation only is input at the start and is identified by the user as a texture data only image. On the basis of these identifications, processing apparatus 2 would identify images to be used to generate the 3D computer surface shape model and perform processing of these images at steps S4-6 to S4-10, and would perform processing at step S4-12 to identify additional images for texture data generation, with the identified texture data images being processed at steps S4-14 and S4-16.

In the embodiment described above, pixel values in the image data generated and displayed at steps S8-8 and S8-12 (FIG. 8) during the processing to register an additional image with the polygon mesh are generated by taking the average of a pixel value in the additional image and the value of the corresponding pixel in the rendered polygon mesh image. In this way, the polygon mesh is displayed overlaid in semi-transparent form on the additional image. However, pixel values from the additional image and pixel values from the rendered polygon mesh may be combined in other ways. In addition, it is not necessary for the polygon mesh to be displayed in semi-transparent form in the resulting image, and it is only necessary that the image be generated and displayed in such a way that the user can see the relative alignment of the rendered polygon mesh and the subject object in the additional image. For example, the respective value of each pixel in the image lying at least partially within the rendered polygon mesh may be calculated by subtracting the value of the pixel in the rendered polygon mesh image from the value of the pixel in the additional image (or vice versa) and taking the modulus of the resulting value. As a further alternative, the image data may be generated at steps S8-8 and S8-12 by carrying out a bit-wise binary logic operation (such as an exclusive-OR operation) for the respective colour component values (R, G, B) of each pixel in the image to be displayed to the user which lies at least partially within the rendered polygon mesh, with the inputs to the logic operation comprising the bits defining the colour value (R, G or B depending on the colour component being processed at the time) of the pixel in the rendered polygon mesh (or a predetermined number of the highest order bits) and the bits defining the colour value (R, G, or B) of the corresponding pixel in the backdrop image (or the same predetermined number of the highest order bits). A respective logic operation is performed for each colour component (R, G, B) to give values for the colour components of the pixel to be displayed. Thus, for example, if the logic operation is an XOR operation, a pixel is displayed darker the more closely the colour components of the pixel in the backdrop image match the colour components of the pixel in the rendered polygon mesh. By generating the combined image data in this way at steps S8-8 and S8-12, the user is able to control the virtual camera to maximise the number of dark pixels in the displayed image within the rendered polygon mesh. Other ways of combining the pixel values to generate the combined image data are, of course, possible.

In the embodiment above, at step S8-8 and step S8-16, values of the intrinsic parameters (focal length etc) for the virtual camera are defined which correspond to the intrinsic camera parameter values input by the user and stored at S4-4. This assumes that the camera used to record each additional image to be used for texture data generation is the same camera as that used to record each image stored at step S4-4 and processed at steps S4-6 and S4-8 to generate the 3D polygon mesh. However, instead, because the camera may be different, the user may be requested at step S8-2 to input data defining the intrinsic parameters of the camera which recorded each additional image and these parameters may be stored at step S8-4 and then used at steps S8-8 and S8-16 as the intrinsic parameters of the virtual camera. Alternatively, the image data for each additional image stored at step S8-4 may be processed to calculate the intrinsic parameters in a conventional manner, for example as described in "Euclidean Reconstruction From Uncalibrated Views" by Hartley in Applications of Invariance in Computer Vision, Mundy, Zisserman and Forsyth eds, pages 237–256, Azores 1993.

In the embodiment above, an example is described in which an additional image 316 showing the base of the subject object 210 is input and processed at steps S4-14 and S4-16 to generate texture data. However, in addition or instead, one or more additional images of any other part of the subject object 210 may be input and processed at steps S4-14 and S4-16. For example, a close-up image of part of the subject object 210 for which detailed texture data is required may be input and processed. Of course, more than one additional image showing the same part (base or otherwise) of the subject object 210 may be input and processed at steps S4-14 and S4-16.

In the embodiment described above, processing is performed by a programmable computer using processing routines defined by programming instructions. However, some, or all, of the processing could, of course, be performed using hardware.

What is claimed is:

1. Apparatus for processing image data defining images of a subject object to generate data defining a three-dimensional computer model of the surface shape of the subject object and texture data therefor, the apparatus comprising:
    a three-dimensional computer model generator operable to process data defining a set of images of a subject object comprising image data defining a plurality of images of the subject object and data defining the imaging positions and directions of the images, to generate data defining a three-dimensional computer model of the surface shape of the subject object having a known position and orientation relative to the images in the set;
    a model registerer operable to register the three-dimensional computer model of the surface shape of the subject object with a further image of the subject object, the model registerer comprising:
        a renderer operable to generate image data defining images of the three-dimensional computer model in accordance with a virtual camera;
        a position controller responsive to user input signals to change the relative position of the virtual camera and three-dimensional computer model;
        a display data generator operable to generate image data for display by combining at least some of the image data of the three-dimensional computer model generated by the renderer with the image data of the further image to generate composite image data defining images of the three-dimensional computer model overlaid on the further image; and
        a viewing parameter writer operable to write data to memory defining viewing parameters of the virtual camera as viewing parameters of the further image, thereby defining the relative position and orientation of the three-dimensional computer model and the further image; and a texture data generator operable to generate texture data for the three-dimensional computer model in dependence upon the image data from at least one image in the set and the further image.

2. Apparatus according to claim 1, wherein the display data generator is operable to generate image data for display defining the images of the three-dimensional computer model generated by the renderer overlaid in semi-transparent form on the further image.

3. Apparatus according to claim 1, wherein the display data generator is operable to set pixel values for at least some pixels in the composite image data in dependence upon the result of a binary logic operation performed for each of the at least some pixels, the inputs to the binary logic operation comprising, for each said pixel, a first value defining a colour value for the pixel in the image data generated by the renderer, and a second value defining the colour value for the pixel in the further image.

4. Apparatus according to claim 1, wherein:
the texture data generator is operable to generate texture data for the three-dimensional computer model in dependence upon the image data from at least one image in the set before operation of the renderer to generate image data defining an image of the three-dimensional computer model during operation of the model registerer;
the renderer is operable to generate image data defining images of the three-dimensional computer model rendered with the texture data generated by the texture data generator during operation of the model registerer; and
the display data generator is operable to generate image data defining the texture-rendered images generated by the renderer overlaid on the further image.

5. Apparatus according to claim 1, wherein:
the renderer is operable to generate image data defining images of the three-dimensional computer model with flat shading; and
the display data generator is operable to generate image data defining the flat-shaded images generated by the renderer overlaid on the further image.

6. Apparatus according to claim 1, wherein:
the apparatus further comprises an intrinsic image parameter writer operable to write data to memory defining a value for at least one intrinsic imaging parameter of a camera; and
the renderer is operable to set an intrinsic imaging parameter of the virtual camera to be the same as the stored parameter(s).

7. Apparatus according to claim 6, wherein the intrinsic imaging parameter writer is operable to write data to memory defining an intrinsic imaging parameter value input by a user.

8. Apparatus according to claim 1, further comprising an image position and orientation calculator operable to process image data defining the plurality of images of the subject object to be used to generate the three-dimensional computer model to generate the data defining the imaging positions and directions of the images for use by the three-dimensional computer model generator.

9. Apparatus according to claim 8, wherein the image position and orientation calculator is operable to calculate the imaging positions and directions in dependence upon features in the images identified by a user.

10. A method, performed in a processing apparatus, of processing image data defining images of a subject object to generate data defining a three-dimensional computer model of the surface shape of the subject object and texture data therefor, the method comprising:
processing data defining a set of images of a subject object comprising image data defining a plurality of images of the subject object and data defining the relative imaging positions and orientations of the images, to generate data defining a three-dimensional computer model of the surface shape of the subject object having a known position and orientation relative to the images in the set;
registering the three-dimensional computer model of the surface shape of the subject object with a further image of the subject object by:
generating image data defining images of the three-dimensional computer model in accordance with a virtual camera;
changing the relative position of the virtual camera and three-dimensional computer model in response to user input signals;
generating image data for display by blending at least some of the image data of the three-dimensional computer model generated in accordance with the virtual camera with at least some of the image data of the further image to generate blended image data defining images of the three-dimensional computer model overlaid on the further image; and
writing data to memory defining viewing parameters of the virtual camera as viewing parameters of the further image, thereby defining the relative position and orientation of the three-dimensional computer model and the further image; and
generating texture data for the three-dimensional computer model in dependence upon the image data from at least one image in the set and the further image.

11. A method according to claim 10, wherein the image data for display is generated as image data defining images of the three-dimensional computer model overlaid in semi-transparent form on the further image.

12. A method according to claim 10, wherein, in the processing to generate the image data for display, pixel values for at least some pixels in the blended image data are set in dependence upon the result of a binary logic operation performed for each of the at least some pixels, the inputs to the binary logic operation comprising, for each said pixel, a first value defining a colour value for the pixel in the image data generated in accordance with the virtual camera, and a second value defining a colour value for the pixel in the further image.

13. A method according to claim 10, wherein:
texture data for the three-dimensional computer model is generated in dependence upon the image data from at least one image in the set before image data defining an image of the three-dimensional computer model is generated in accordance with the virtual camera during the processing to register the three-dimensional computer model with the further image;
during the processing to register the three-dimensional computer model with the further image, the image data generated in accordance with the virtual camera comprises image data defining images of the three-dimensional computer model rendered with the generated texture data; and in the processing to generate image data for display, image data is generated defining the texture-rendered images overlaid on the further image.

14. A method according to claim 10, wherein:
during the processing to register the three-dimensional computer model with the further image, the image data generated in accordance with the virtual camera comprises image data defining images of the three-dimensional computer model with flat shading; and
in the processing to generate image data for display, image data is generated defining the flat-shaded images overlaid on the further image.

15. A method according to claim 10, further comprising writing data to memory defining a value for at least one intrinsic imaging parameter of a camera, and wherein at least one intrinsic imaging parameter of the virtual camera is set to be the same as the stored parameter(s).

16. A method according to claim 15, wherein the value of the intrinsic imaging parameter(s) written to memory defines an intrinsic imaging parameter value input by a user.

17. A method according to claim 10, further comprising processing image data defining the plurality of images to be used to generate the three-dimensional computer model to generate the data defining the relative imaging positions and orientations of the images for use in generating the three-dimensional computer model.

18. A method according to claim 17, wherein the relative imaging positions and orientations are calculated in dependence upon features in the images identified by a user.

19. A method according to claim 18, further comprising making a recording of the signal either directly or indirectly.

20. A method according to claim 10, further comprising outputting a signal from the processing apparatus carrying the data defining the three-dimensional computer model of the surface shape of the subject object and the generated texture data therefor.

21. Apparatus for processing image data defining an input image of a subject object and data defining a three-dimensional computer model of the surface shape of the subject object, to generate texture data for the three-dimensional computer model, the apparatus comprising:
a model registerer operable to register the three-dimensional computer model of the surface shape of the subject object with the input image of the subject object, the model registerer comprising:
a renderer operable to generate image data defining images of the three-dimensional computer model in accordance with a virtual camera;
a position controller responsive to user input signals to change the relative position of the virtual camera and three-dimensional computer model;
a display data generator operable to generate image data for display by combining at least some of the image data of the three-dimensional computer model generated by the renderer with the image data of the input image to generate composite image data defining images of the three-dimensional computer model overlaid on the input image; and
a viewing parameter writer operable to write data to memory defining viewing parameters of the virtual camera as viewing parameters of the input image, thereby defining the relative position and orientation of the three-dimensional computer model and the input image; and
a texture data generator operable to generate texture data for the three-dimensional computer model in dependence upon the image data from the input image and in dependence upon the position and orientation of the input image relative to the three-dimensional computer model determined by the model registerer.

22. A method of processing image data defining an input image of a subject object and data defining a three-dimensional computer model of the surface shape of the subject object, to generate texture data for the three-dimensional computer model, the method comprising:
a registering the three-dimensional computer model of the surface shape of the subject object with the input image of the subject object by:
generating image data defining images of the three-dimensional computer model in accordance with a virtual camera;
changing the relative position of the virtual camera and three-dimensional computer model in response to user input signals;
generating image data for display by combining at least some of the image data of the three-dimensional computer model generated in accordance with the virtual camera with the image data of the input image to generate composite image data defining images of the three-dimensional computer-model overlaid on the input image; and
writing data to memory defining viewing parameters of the virtual camera as viewing parameters of the input image, thereby defining the relative position and orientation of the three-dimensional computer model and the input image; and
generating texture data for the three-dimensional computer model in dependence upon the image data from the input image and in dependence upon the position and orientation of the input image relative to the three-dimensional computer model determined by the registration process.

23. Apparatus for processing image data defining images of a subject object to generate data defining a three-dimensional computer model of the surface shape of the subject object and texture data therefor, the apparatus comprising:
means for processing data defining a set of images of a subject object comprising image data defining a plurality of images of the subject object and data defining the imaging positions and directions of the images, to generate data defining a three-dimensional computer model of the surface shape of the subject object having a known position and orientation relative to the images in the set;
model registration means for registering the three-dimensional computer model of the surface shape of the subject object with a further image of the subject object, the model registration means comprising:
three-dimensional model viewing means for generating image data defining images of the three-dimensional computer model in accordance with a virtual camera;
position control means for changing the relative position of the virtual camera and three-dimensional computer model in response to user input signals;
display data generating means for generating image data for display by combining at least some of the image data of the three-dimensional computer model generated by the three-dimensional model viewing means with the image data of the further image to generate composite image data defining images of the three-dimensional computer model overlaid on the further image; and
means for writing data to memory defining viewing parameters of the virtual camera as viewing parameters of the further image, thereby defining the relative position and orientation of the three-dimensional computer model and the further image; and texture data generating means for generating texture data for the three-dimensional computer model in dependence upon the image data from at least one image in the set and the further image.

24. Apparatus for processing image data defining an input image of a subject object and data defining a three-dimensional computer model of the surface shape of the subject object, to generate texture data for the three-dimensional computer model, the apparatus comprising:

model registration means for registering the three-dimensional computer model of the surface shape of the subject object with the input image of the subject object, the model registration means comprising:

three-dimensional model viewing means for generating image data defining images of the three-dimensional computer model in accordance with a virtual camera;

position control means for changing the relative position of the virtual camera and three-dimensional computer model in response to the user input signals;

display data generating means for generating image data for display by combining at least some of the image data of the three-dimensional computer model generated by the three-dimensional model viewing means with the image data of the input image to generate composite image data defining images of the three-dimensional computer model overlaid on the input image; and means for writing data to memory defining viewing parameters of the virtual camera as viewing parameters of the input image, thereby defining the relative position and orientation of the three-dimensional computer model and the input image; and texture data generating means for generating texture data for the three-dimensional computer model in dependence upon the image data from the input image and in dependence upon the position and orientation of the input image relative to the three-dimensional computer model determined by the model registration means.

25. A storage medium storing computer program instructions for programming a programmable processing apparatus to become configured as an apparatus as set out in any of claims 1, 21, 23 and 24.

26. A signal carrying computer program instructions for programming a programmable processing apparatus to become configured as an apparatus as set out in any of claims 1, 21, 23 and 24.

* * * * *

UNITED STATES PATENT AND TRADEMARK OFFICE
CERTIFICATE OF CORRECTION

| | |
|---|---|
| PATENT NO. | : 7,034,821 B2 |
| APPLICATION NO. | : 10/413290 |
| DATED | : April 25, 2006 |
| INVENTOR(S) | : Adam Michael Baumberg |

It is certified that error appears in the above-identified patent and that said Letters Patent is hereby corrected as shown below:

ON TITLE PAGE AT ITEM (75) INVENTOR

"Adam Michael Baumberg, Bracknell (GB)" should read --Adam Michael Baumberg, Bracknell (UK)--.

ON TITLE PAGE AT ITEM (73) ASSIGNMENT

"Canon Kabushiki Kaisha, Tokyo (JP)" should read --Canon Europa N.V., Amstelveen (NL)--.

ON TITLE PAGE AT ITEM (56) FOREIGN PATENT DOCUMENTS

"EP 0 898 245  A1   7/1998" should be deleted.

ON TITLE PAGE AT ITEM (56) OTHER PUBLICATIONS

After "J. Illingworth et al.,": "Obj ct" should read --Object--; and
After "Peter J. Neugebauer et al.,": "Unr gister d" should read --Unregistered--.

COLUMN 9

Line 41, "co-pending" (2nd occurrence) should be deleted.

COLUMN 12

Line 48, "until the" (2nd occurrence) should be deleted.

COLUMN 15

Line 60, "maximise" should read --maximize--.

UNITED STATES PATENT AND TRADEMARK OFFICE
CERTIFICATE OF CORRECTION

PATENT NO. : 7,034,821 B2
APPLICATION NO. : 10/413290
DATED : April 25, 2006
INVENTOR(S) : Adam Michael Baumberg It is certified that error appears in the above-identified patent and that said Letters Patent is hereby corrected as shown below:

COLUMN 17

Line 20 claim 3, "colour" should read --color--; and
Line 22 claim 3, "colour" should read --color--.

COLUMN 18

Line 50 claim 12, "colour" should read --color--; and
Line 52 claim 12, "colour" should read --color--.

COLUMN 20

Line 9 claim 22, "a" should be deleted; and
Line 23 claim 22, "computer-model" should read --computer model--.

Signed and Sealed this

Second Day of December, 2008

JON W. DUDAS
*Director of the United States Patent and Trademark Office*